(12) United States Patent
Chiu et al.

(10) Patent No.: US 12,464,843 B2
(45) Date of Patent: Nov. 4, 2025

(54) IMAGE SENSOR AND MANUFACTURING METHOD THEREOF

(71) Applicant: VisEra Technologies Company Ltd., Hsin-Chu (TW)

(72) Inventors: Yi-Hua Chiu, Hsin-Chu (TW); Wei-Ko Wang, Hsin-Chu (TW); Shih-Liang Ku, Hsin-Chu (TW)

(73) Assignee: VISERA TECHNOLOGIES COMPANY LTD., Hsin-Chu (TW)

( * ) Notice: Subject to any disclaimer, the term of this patent is extended or adjusted under 35 U.S.C. 154(b) by 434 days.

(21) Appl. No.: 18/319,310

(22) Filed: May 17, 2023

(65) Prior Publication Data
US 2024/0021639 A1 Jan. 18, 2024

Related U.S. Application Data

(60) Provisional application No. 63/394,514, filed on Aug. 2, 2022, provisional application No. 63/390,012, filed on Jul. 18, 2022.

(51) Int. Cl.
*H10F 39/00* (2025.01)
*H04N 23/10* (2023.01)
(Continued)

(52) U.S. Cl.
CPC ......... *H10F 39/8063* (2025.01); *H04N 23/10* (2023.01); *H04N 23/54* (2023.01);
(Continued)

(58) Field of Classification Search
CPC .. H10F 39/8063; H10F 39/024; H10F 39/026; H10F 39/8053; H10F 39/8057; H10F 39/809; H04N 23/10–13; H04N 23/54; H04N 23/55; H04N 25/10–17; H04N 25/76–78; H04N 25/79
See application file for complete search history.

(56) References Cited

U.S. PATENT DOCUMENTS 6,534,340 B1 3/2003 Karpman et al.
2011/0235017 A1* 9/2011 Iwasaki ................ H04N 25/133
250/226

(Continued)

FOREIGN PATENT DOCUMENTS

TW        I-742989 B  * 10/2021    ......... H10F 39/014
WO      2022080168 A     4/2022
WO      2023112479 A     6/2023

*Primary Examiner* — Twyler L Haskins
*Assistant Examiner* — Akshay Trehan
(74) *Attorney, Agent, or Firm* — LIU & LIU

(57) ABSTRACT

A manufacturing method includes the following operations. A lens layer is formed above a substrate. A patterned hard mask layer is formed on the lens layer. The lens layer is etched to transfer a pattern of the patterned hard mask layer to the lens layer such that a plurality of lenses are defined, wherein the lens are micro-lenses or meta-surface lenses. A cladding layer is formed to cover the plurality of lenses and the substrate. Portions of the cladding layer are etched to form a first inclined sidewall and a second inclined sidewall, wherein the first inclined sidewall is above the second inclined sidewall, wherein a projection of the first inclined sidewall on the substrate is spaced apart from a projection of the second inclined sidewall on the substrate.

20 Claims, 25 Drawing Sheets

(51) Int. Cl.
*H04N 23/54* (2023.01)
*H04N 23/55* (2023.01)
*H04N 25/10* (2023.01)
*H04N 25/76* (2023.01)
*H04N 25/773* (2023.01)
*H04N 25/79* (2023.01)

(52) U.S. Cl.
CPC ............ *H04N 23/55* (2023.01); *H04N 25/10* (2023.01); *H04N 25/79* (2023.01); *H10F 39/024* (2025.01); *H10F 39/026* (2025.01); *H10F 39/8053* (2025.01); *H10F 39/8057* (2025.01); *H10F 39/809* (2025.01); *H04N 25/76* (2023.01); *H04N 25/773* (2023.01)

(56) References Cited

U.S. PATENT DOCUMENTS

| | | | |
|---|---|---|---|
| 2013/0134540 A1* | 5/2013 | Maeda | H10F 77/413 438/69 |
| 2020/0243597 A1 | 7/2020 | Saeki et al. | |
| 2022/0139996 A1* | 5/2022 | Lin | H10F 39/8063 257/432 |

* cited by examiner

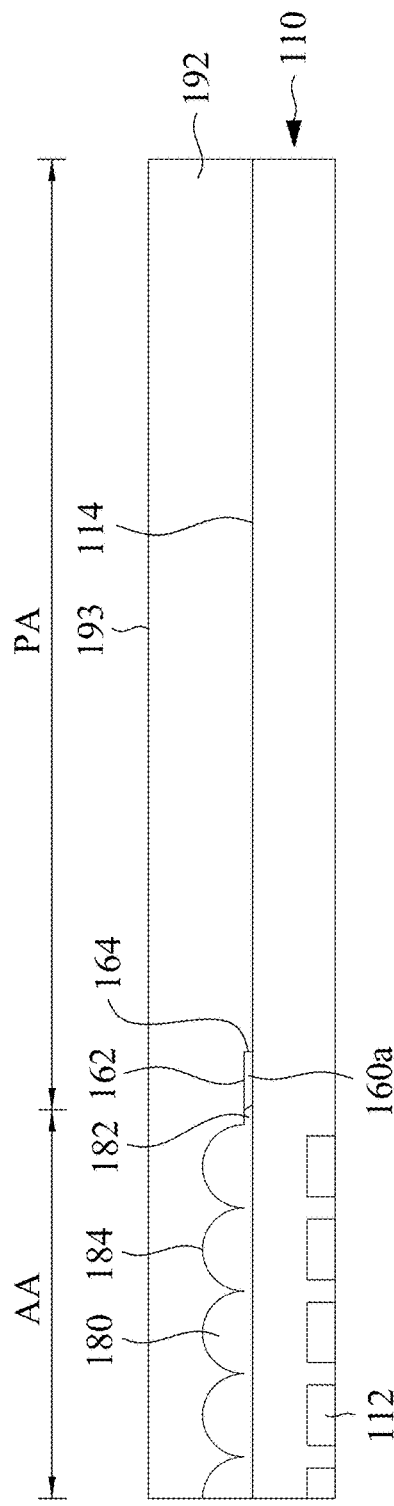
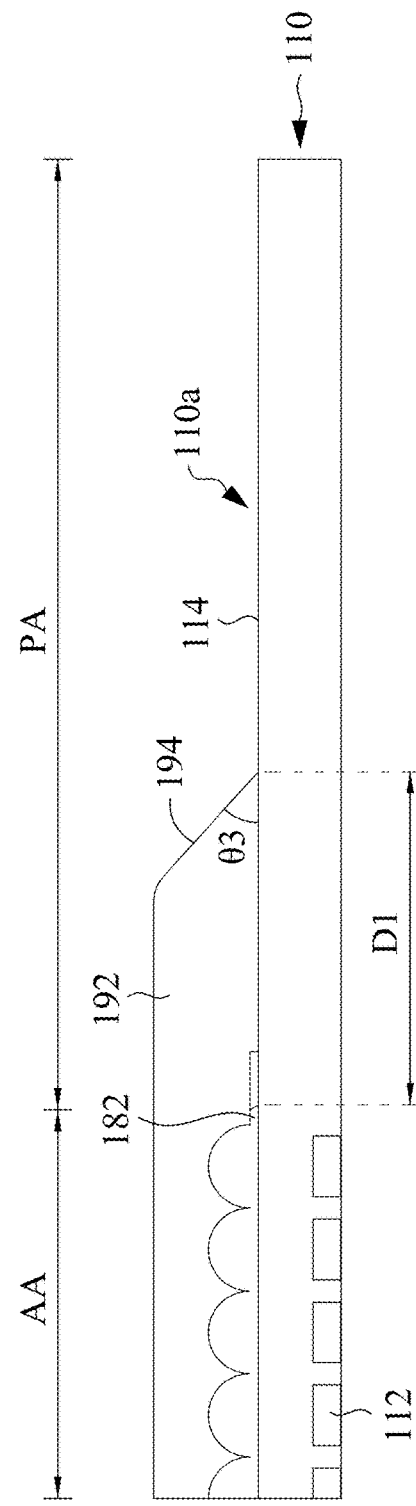

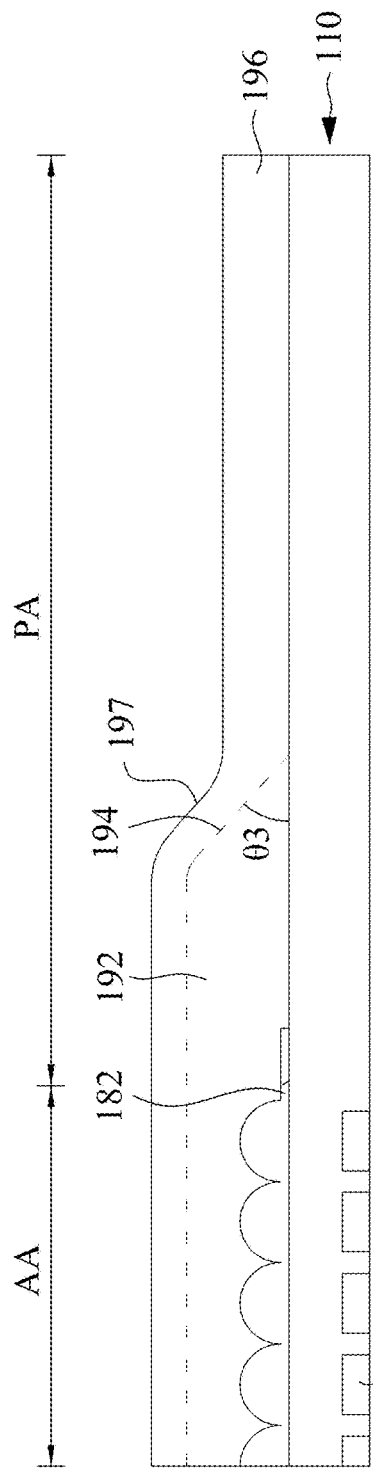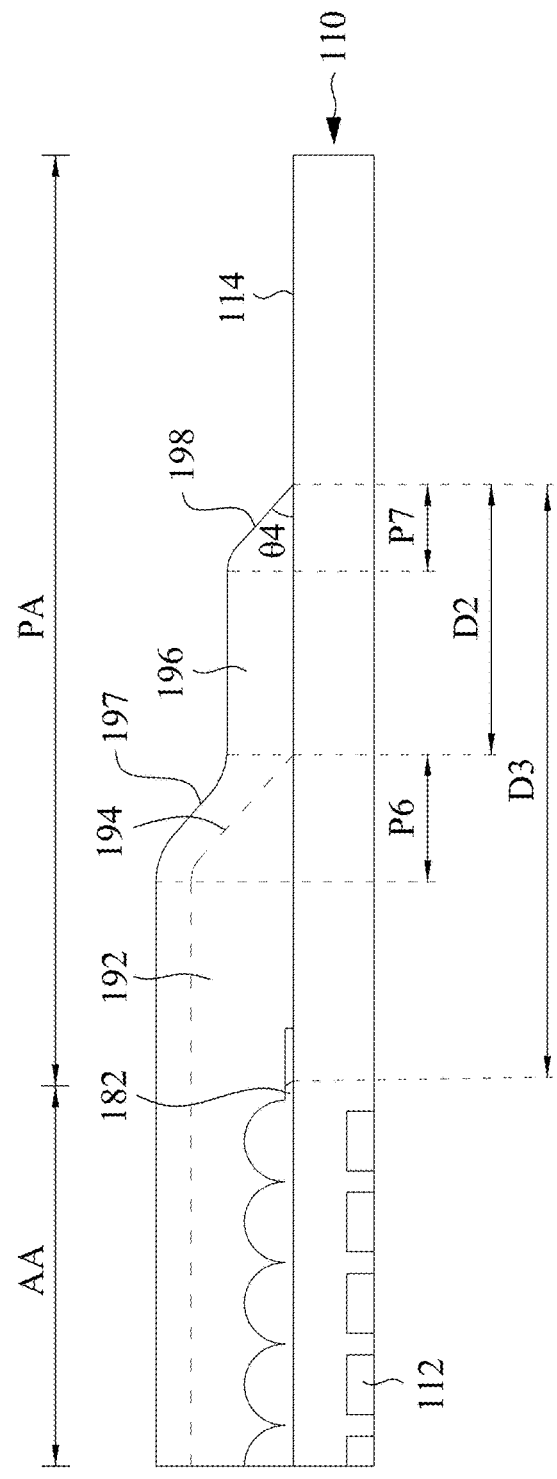

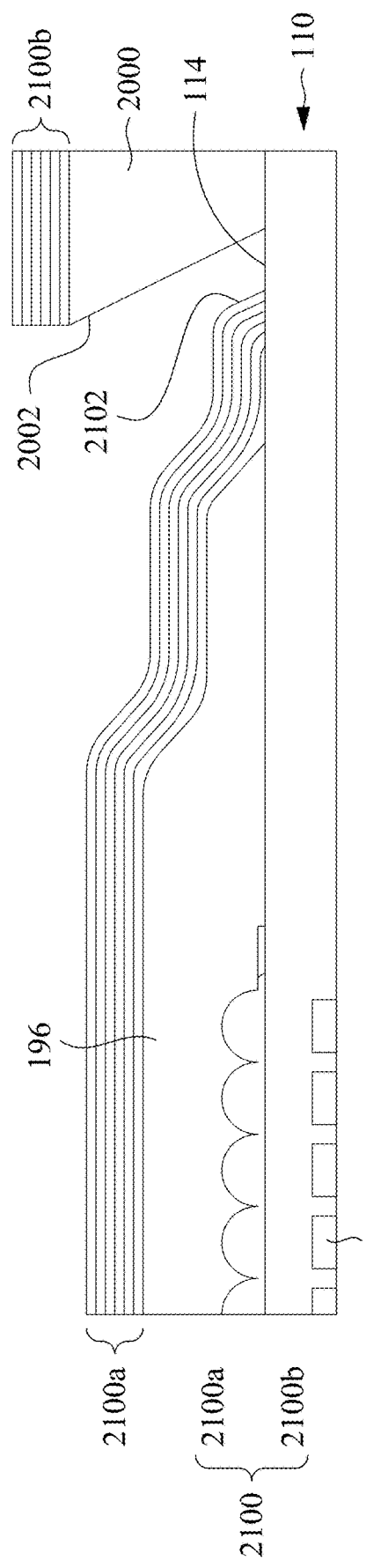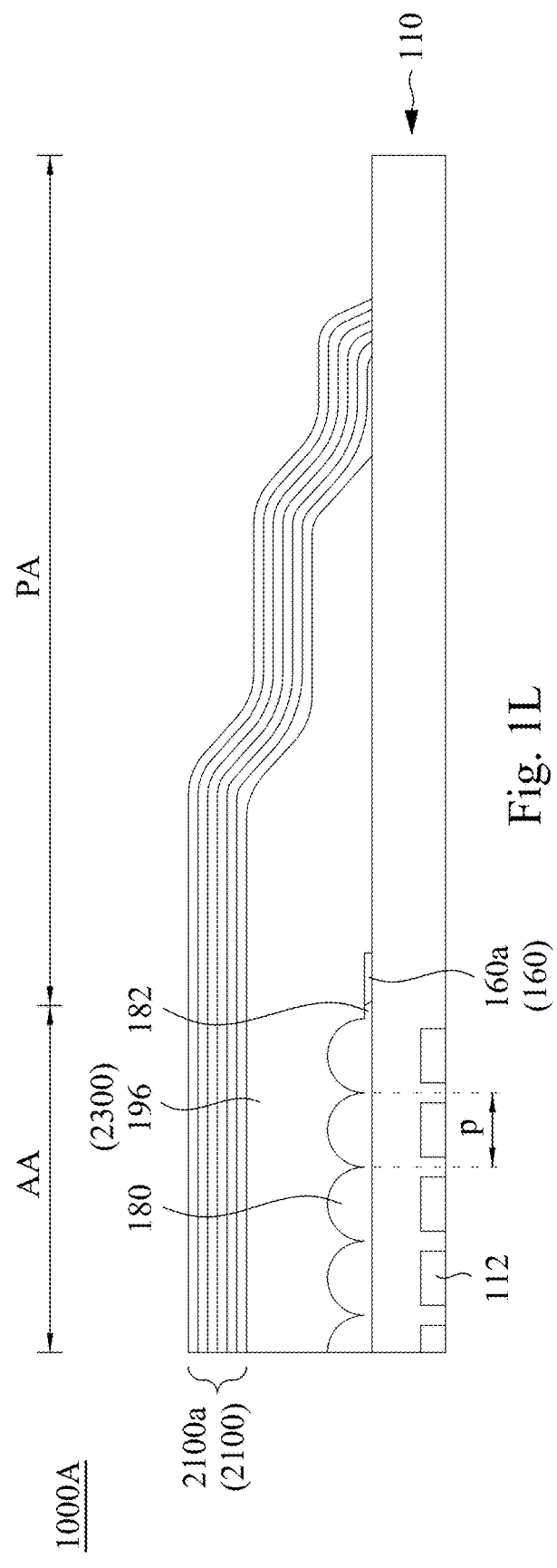

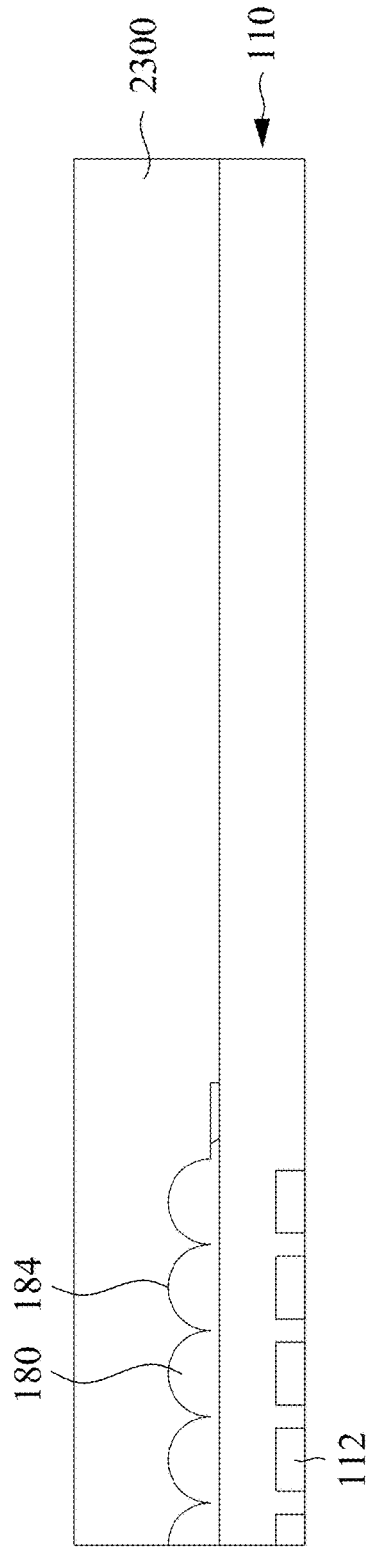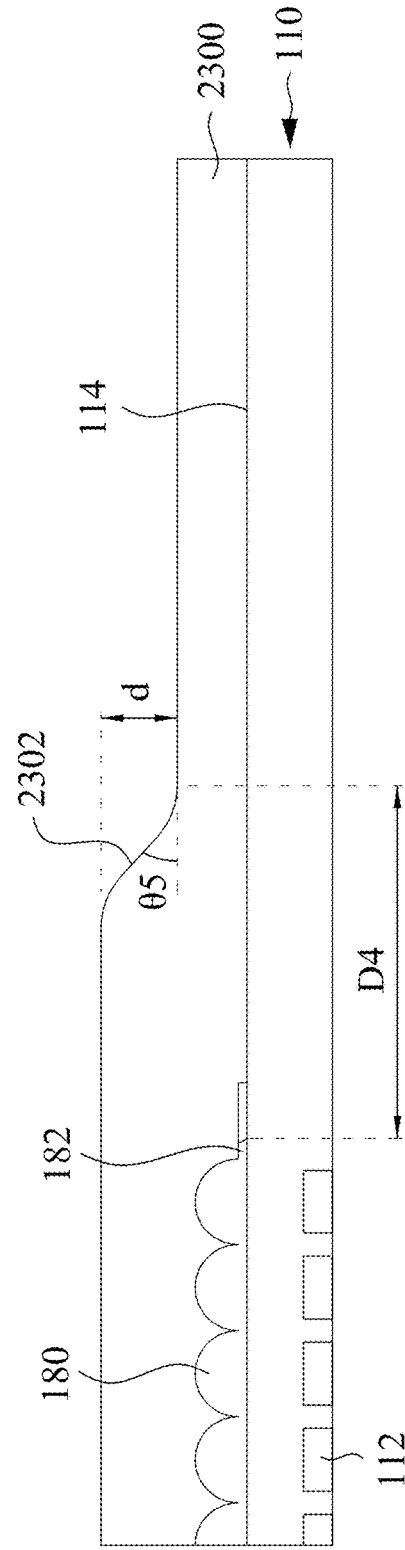

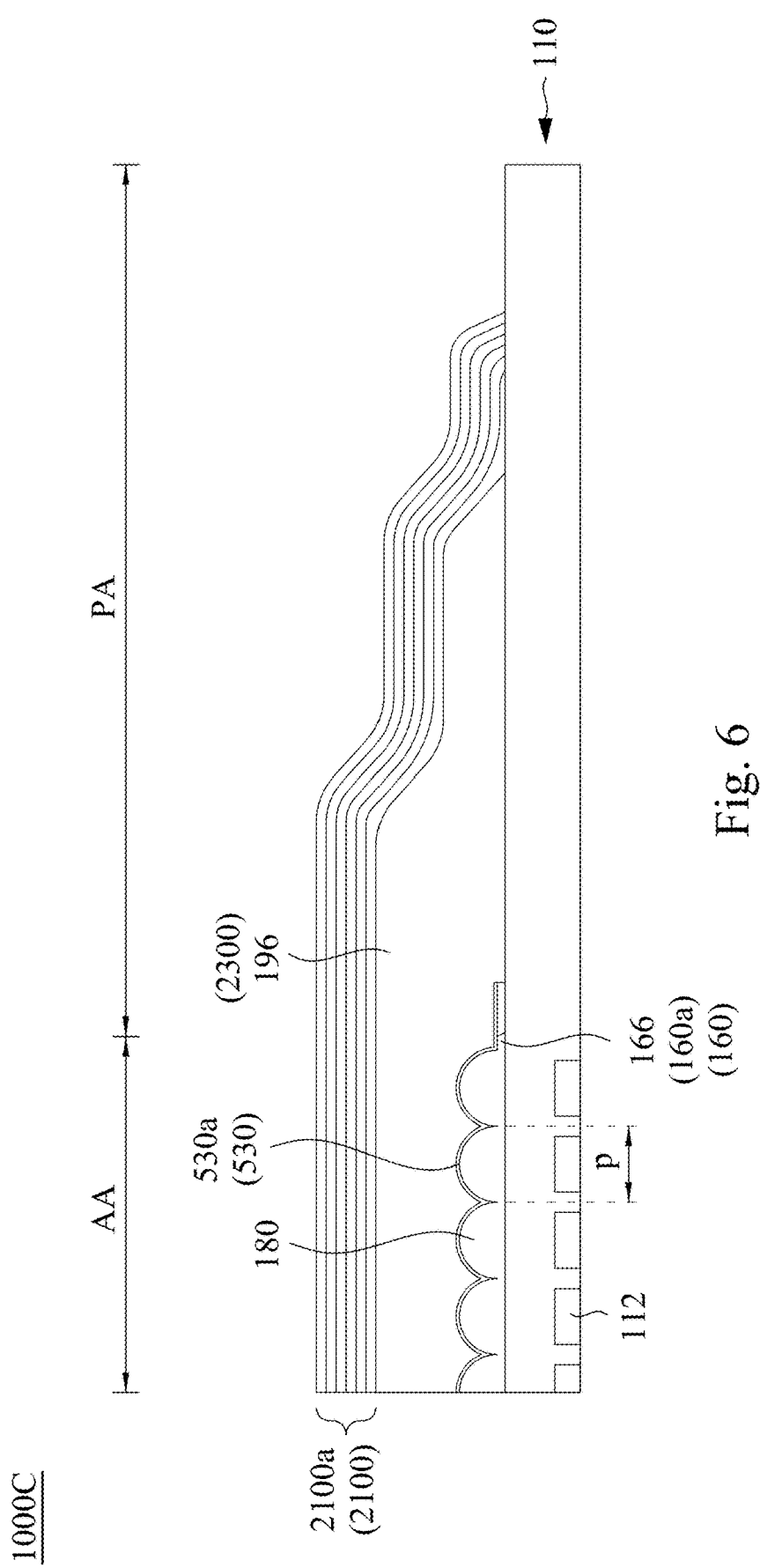

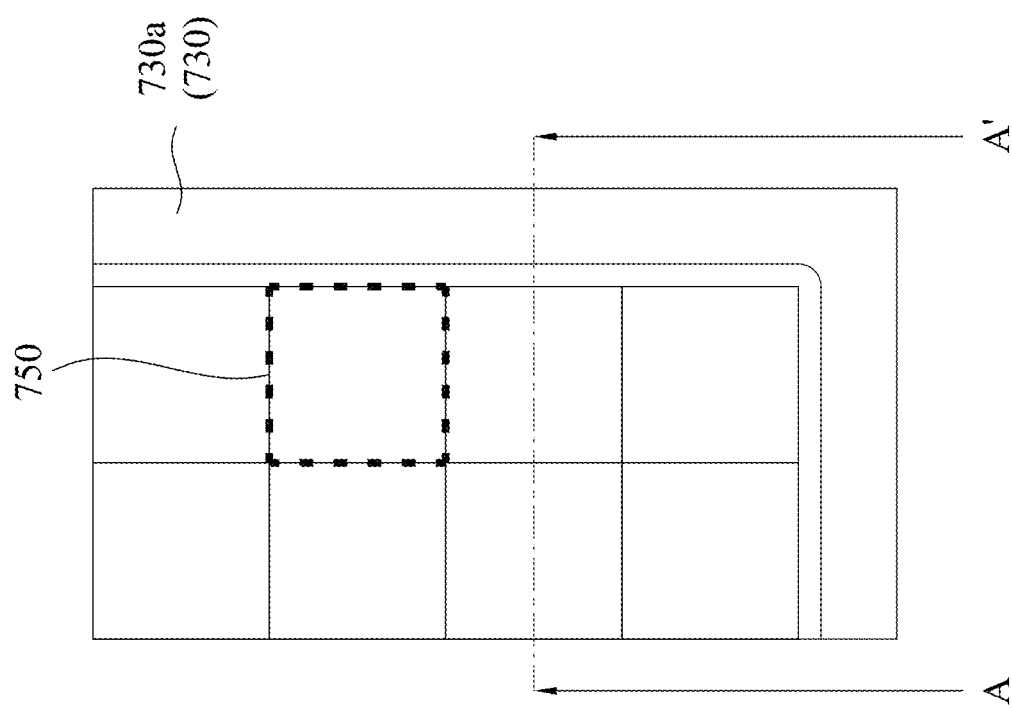

IMAGE SENSOR AND MANUFACTURING METHOD THEREOF

CROSS-REFERENCE TO RELATED APPLICATION

This application claims priority to U.S. Provisional Application Ser. No. 63/390,012, filed Jul. 18, 2022, and U.S. Provisional Application Ser. No. 63/394,514, filed Aug. 2, 2022, the disclosures of which are incorporated herein by reference in their entireties.

BACKGROUND

Field of Invention

The present disclosure relates to an image sensor and a manufacturing method for the image sensor.

Description of Related Art

In the field of complementary metal oxide semiconductor (CMOS) image sensors (also could be referred to as CIS), a lens array could be disposed above photosensitive elements to receive an external light. However, an etching process may damage a substrate below a lens material when forming the lens array. In addition, elements disposed above the lens array may cause a stress imbalance between the elements and the lens array, thereby wafer bending may be occurred. Therefore, there is a need to solve the above problems.

SUMMARY

The manufacturing method for an image sensor of the present disclosure could solve the problems mentioned above in the manufacturing process, thereby improving the performance of the image sensor.

The image sensor of the present disclosure has a smoother slopping to solve a stress imbalance at the boundary of a lens array and elements disposed above the lens array.

One aspect of the present disclosure is to provide a manufacturing method for an image sensor. The manufacturing method includes the following operations. A substrate is provided. A lens layer is formed above the substrate. A patterned hard mask layer is formed on the lens layer. The lens layer is etched to transfer a pattern of the patterned hard mask layer to the lens layer such that a plurality of lenses are defined, wherein the lens are micro-lenses or meta-surface lenses. A cladding layer is formed to cover the plurality of lenses and the substrate. Portions of the cladding layer are etched to form a first inclined sidewall and a second inclined sidewall, wherein the second inclined sidewall is above the first inclined sidewall, wherein a projection of the first inclined sidewall on the substrate is spaced apart from a projection of the second inclined sidewall on the substrate. A bandpass filter layer having multiple films is conformally formed on the cladding layer and covers the substrate.

According to some embodiments of the present disclosure, before forming the lens layer above the substrate, further includes the following operations. A photoresist layer with a third inclined sidewall and having a trench on the substrate is formed. The lens layer with a fourth inclined sidewall is formed in the trench. The photoresist layer is removed, wherein an angle between the third inclined sidewall and a top surface of the substrate is greater than 90 degrees, and an angle between the fourth inclined sidewall and the top surface of the substrate is less than 90 degrees.

According to some embodiments of the present disclosure, after forming the lens layer above the substrate, further includes the following operations. A refill layer is formed on the substrate and surrounding the lens layer, wherein a top surface of the lens layer is substantially coplanar with a top surface of the refill layer. The patterned hard mask layer is formed on the refill layer. The refill layer is etched to transfer the pattern of the patterned hard mask layer to the refill layer such that a remaining portion of the refill layer and an underlying layer are defined, wherein the underlying layer is disposed between the plurality of lenses and the substrate, and the underlying layer connects to the remaining portion.

According to some embodiments of the present disclosure, after the remaining portion of the refill layer and the underlying layer are defined, further includes the following operations. A protection layer is formed to cover the plurality of lenses and expose the remaining portion of the refill layer. The remaining portion of the refill layer is removed. The protection layer is removed. An anti-reflective film is formed on top surfaces of the plurality of lenses.

According to some embodiments of the present disclosure, after the remaining portion of the refill layer and the underlying layer are defined, further includes the following operations. A protection layer is formed to cover the plurality of lenses and a first portion of the remaining portion of the refill layer, wherein a second portion of the remaining portion of the refill layer is exposed. The second portion of the remaining portion of the refill layer is removed. The protection layer is removed. An anti-reflective film is formed on top surfaces of the plurality of lenses and a top surface of the first portion of the remaining portion of the refill layer.

According to some embodiments of the present disclosure, before forming the lens layer above the substrate, an underlying layer is formed on the substrate.

According to some embodiments of the present disclosure, in the operation of forming the cladding layer to cover the plurality of lenses and the substrate and the operation of etching the portions of the cladding layer to form the first inclined sidewall and the second inclined sidewall, further includes the following operations. A first cladding layer is formed to cover the plurality of lenses and the substrate. A portion of the first cladding layer is etched to expose a portion of the substrate and form a third inclined sidewall. A second cladding layer is formed on the first cladding layer and the portion of the substrate to form the first inclined sidewall on a top of the cladding layer. A portion of the second cladding layer is etched to form the second inclined sidewall on a bottom of the cladding layer.

According to some embodiments of the present disclosure, an angle between the second inclined sidewall and a top surface of the substrate is in a range from 20 degrees to 60 degrees, wherein an angle between the third inclined sidewall and the top surface of the substrate is in a range from 20 degrees to 60 degrees.

According to some embodiments of the present disclosure, in the operation of etching the portions of the cladding layer to form the first inclined sidewall and the second inclined sidewall, further includes the following operations. A first portion of the cladding layer is etched to form the first inclined sidewall on a top of the cladding layer, wherein an angle between the first inclined sidewall and a top surface of the substrate is in a range from 20 degrees to 60 degrees. A second portion of the cladding layer is etched to form the second inclined sidewall on a bottom of the cladding layer, wherein an angle between the second inclined sidewall and the top surface of the substrate is in a range from 20 degrees to 60 degrees.

One aspect of the present disclosure is to provide an image sensor. The image sensor includes a substrate, a plurality of lenses, a cladding layer, and a bandpass filter layer. The plurality of lenses are disposed on the substrate, wherein the plurality of lenses are micro-lenses or meta-surface lenses. The cladding layer is disposed on the plurality of lenses and the substrate. The cladding layer has a first inclined sidewall and a second inclined sidewall, and the first inclined sidewall is above the second inclined sidewall. A projection of the first inclined sidewall on the substrate is spaced apart from a projection of the second inclined sidewall on the substrate. The bandpass filter layer having multiple films conformally is disposed on the cladding layer and covers the substrate.

According to some embodiments of the present disclosure, the image sensor further includes an anti-reflective film disposed on top surfaces of the lens.

According to some embodiments of the present disclosure, the image sensor further includes a refill layer disposed on the substrate and surrounding the plurality of lenses, wherein a thickness of the refill layer is in a range from 0.1 µm to 100 µm.

According to some embodiments of the present disclosure, the image sensor further includes an anti-reflective film disposed on top surfaces of the lens and a top surface of the refill layer.

According to some embodiments of the present disclosure, the image sensor further includes an underlying layer disposed between the plurality of lenses and the substrate, wherein a thickness of the underlying layer is in a range from 0.01 µm to 100 µm.

According to some embodiments of the present disclosure, a material of the lenses is a-Si, SiH, GeH, Ge, GeO, or GeSiH.

According to some embodiments of the present disclosure, a material of the underlying layer is different from a material of the lenses.

According to some embodiments of the present disclosure, a material of the underlying layer is the same as a material of the lenses, and a thickness of the underlying layer is in a range from 0.01 µm to 100 µm.

According to some embodiments of the present disclosure, a distance between an outermost of the second inclined sidewall to an outermost of the underlying layer is in a range from 40 µm to 100 µm.

According to some embodiments of the present disclosure, when the plurality of lenses are micro-lens, a projection of the micro-lenses on the substrate is in a projection of the underlying layer on the substrate.

According to some embodiments of the present disclosure, an angle between the first inclined sidewall and a top surface of the substrate is in a range from 20 degrees to 60 degrees, wherein an angle between the second inclined sidewall and the top surface of the substrate is in a range from 20 degrees to 60 degrees.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A to FIG. 1L are a series of cross-sectional views of a manufacturing method for an image sensor in accordance with some embodiments of the present disclosure.

FIG. 2A to FIG. 2C are a series of cross-sectional views of manufacturing a cladding layer of the image sensor of FIG. 1L in accordance with alternative embodiments of the present disclosure.

FIG. 6 is a cross-sectional view of an image sensor in accordance with the manufacturing method illustrated in FIG. 5A to FIG. 5F.

FIG. 12 is a top view of a region of the image sensor illustrated in FIG. 8.

DETAILED DESCRIPTION

Figure 1A:
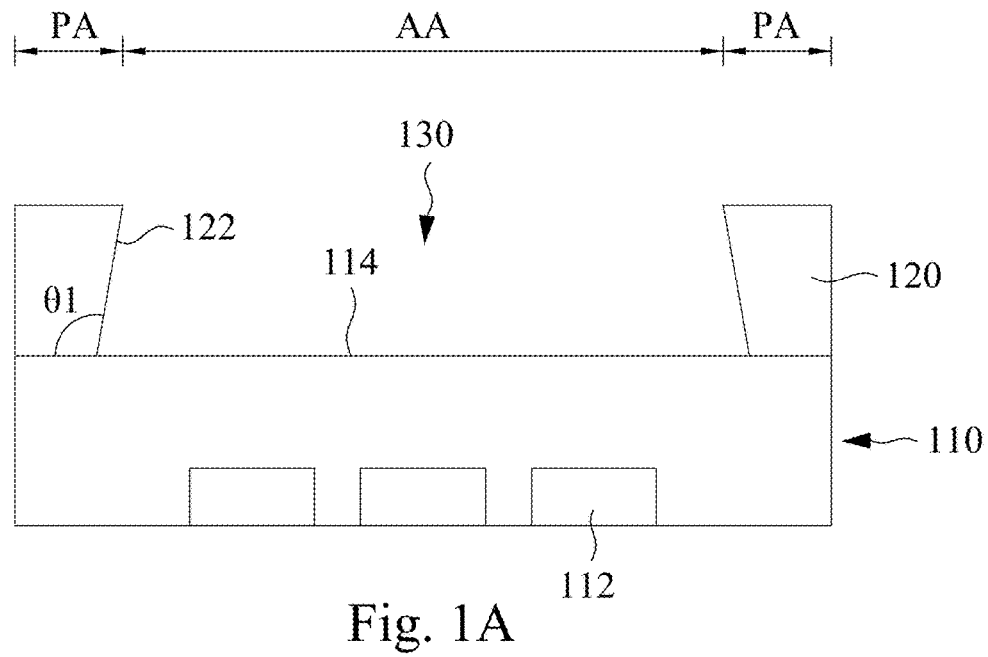

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present invention discloses 7 embodiments of image sensors (shown in FIG. 1L, FIG. 4, FIG. 6, and FIG. 8 to FIG. 11) and two kinds of lenses in these 7 embodiments, which are micro-lenses or meta-surface lenses. In the image sensors of FIG. 1L, FIG. 4, and FIG. 6, the lenses 180 are micro-lenses. In the image sensors of FIG. 8 to FIG. 11, the lenses 750 are meta-surface lenses. Embodiments of the methods and the structures of the present disclosure will be described in detail below.

It is understood that additional operations can be provided before, during, and after processes shown by the following figures, and some of the operations described below can be replaced or eliminated, for additional embodiments of the process. The order of the operations may be interchangeable.

FIG. 1A to FIG. 1L are a series of cross-sectional views of a manufacturing method for an image sensor 1000A in accordance with some embodiments of the present disclosure. As shown in FIG. 1A, a substrate 110 is provided and includes a photosensitive circuit array embedded in the substrate 110. The photosensitive circuit array includes a plurality of photosensitive elements 112. The photosensitive element 112 may be photodiode or single-photon avalanche diodes (SPAD), but not limited thereto. The photosensitive circuit array is configured to detect external light. A photoresist layer 120 is disposed on the substrate 110 and a trench 130 is formed in the photoresist layer 120. In other words, the substrate 110 and the photoresist layer 120 form the trench 130. It should be understood that the photoresist layer 120 and the trench 130 define a lens array area AA where a plurality of lenses (including micro-lenses or meta-surface lenses) will be formed, and a periphery area PA is an area without lenses.

As shown in FIG. 1A, the photoresist layer 120 has an obtuse angle θ1 between an inclined sidewall 122 of the photoresist layer 120 and a top surface 114 of the substrate 110 so that the inclined sidewall 122 faces toward the top surface 114 of the substrate 110. The obtuse angle θ1 is greater than 90 degrees. In some embodiment, a material of the photoresist layer 120 may be a positive-type photoresist or a negative-type photoresist. In some embodiment, the pattern of the photoresist layer 120 may be formed by a lithography process. The inclined sidewall 122 may be formed by adjusting the focus of photolithography, but not limited thereto.

Figure 1B:
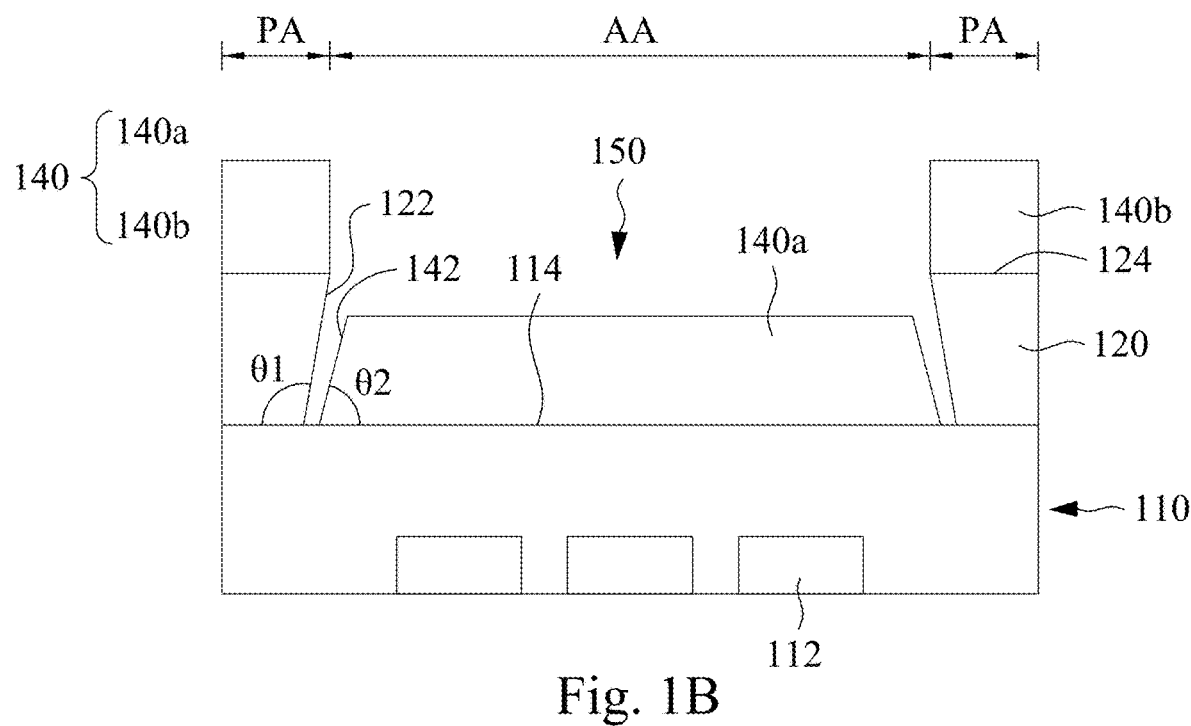

As shown in FIG. 1A and FIG. 1B, a lens layer 140 is formed above the substrate 110. Specifically, a first portion 140a of the lens layer 140 is formed on the top surface 114 of the substrate 110, and a second portion 140b of the lens layer 140 is formed on a top surface 124 of the photoresist layer 120, so that a trench 150 is formed above the substrate 110. It could be understood that the first portion 140a and the second portion 140b of the lens layer 140 are formed at the same time. In some embodiments, a thickness of the first portion 140a is the same as a thickness of the second portion 140b. In some embodiments, the lens layer 140 may be formed by a physical vapor deposition (PVD), a chemical vapor deposition (CVD), a plasma enhanced chemical vapor deposition (PECVD), or other suitable deposition process. In the deposition process of the lens layer 140, the photoresist layer 120 could be used as eaves so that the first portion 140a of the lens layer 140 has an inclined sidewall 142. The first portion 140a has an acute angle θ2 between the inclined sidewall 142 of the first portion 140a and the top surface 114 of the substrate 110 so that the inclined sidewall 142 faces toward the inclined sidewall 122. The acute angle θ2 is less than 90 degrees. The first portion 140a has a trapezoid shape. In some embodiments, a slope of the inclined sidewall 122 is greater than a slope of the inclined sidewall 142.

As shown in FIG. 1B, an air gap presents between the inclined sidewall 122 and the inclined sidewall 142. In some embodiments, the lens layer 140 is formed by an inorganic material including a-Si, SiH, GeH, Ge, GeO, GeSiH, or other suitable material.

Figure 1C:
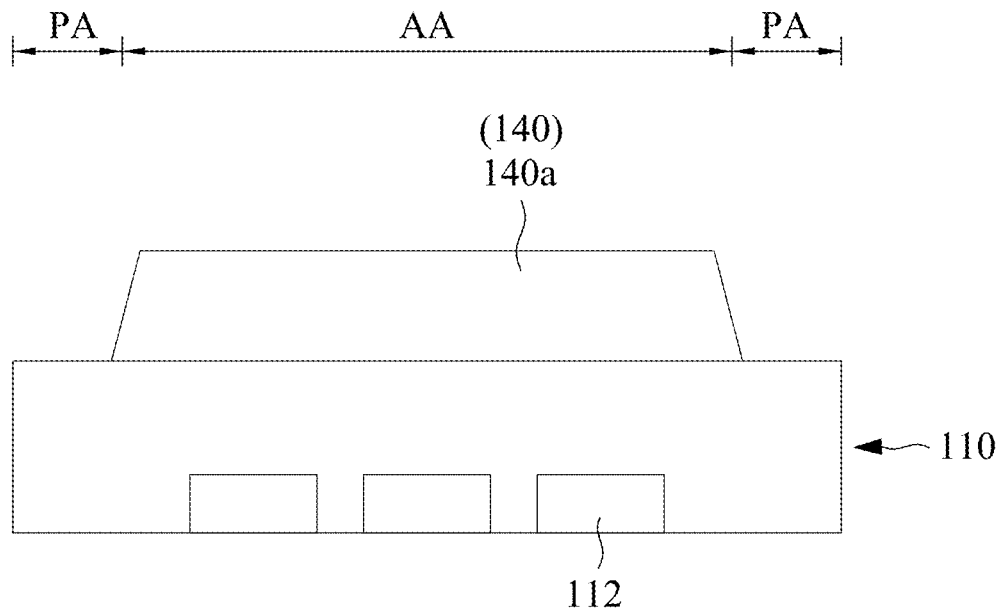

As shown in FIG. 1B and FIG. 1C, the photoresist layer 120 is removed. Specifically, the photoresist layer 120 and the second portion 140b of the lens layer 140 are removed from the periphery area PA. In some embodiments, the remove process is performed by a lift-off process. Specifically, the structure shown in FIG. 1B is dipped in an aqueous solution that has a relatively high solubility or swelling ability for the photoresist layer 120 compared to the lens layer 140. Therefore, the first portion 140a of the lens layer 140 is remained on the substrate 110. The lift-off process of the present disclosure could reduce the film stress to avoid stress imbalance and wafer bending.

Figure 1D:
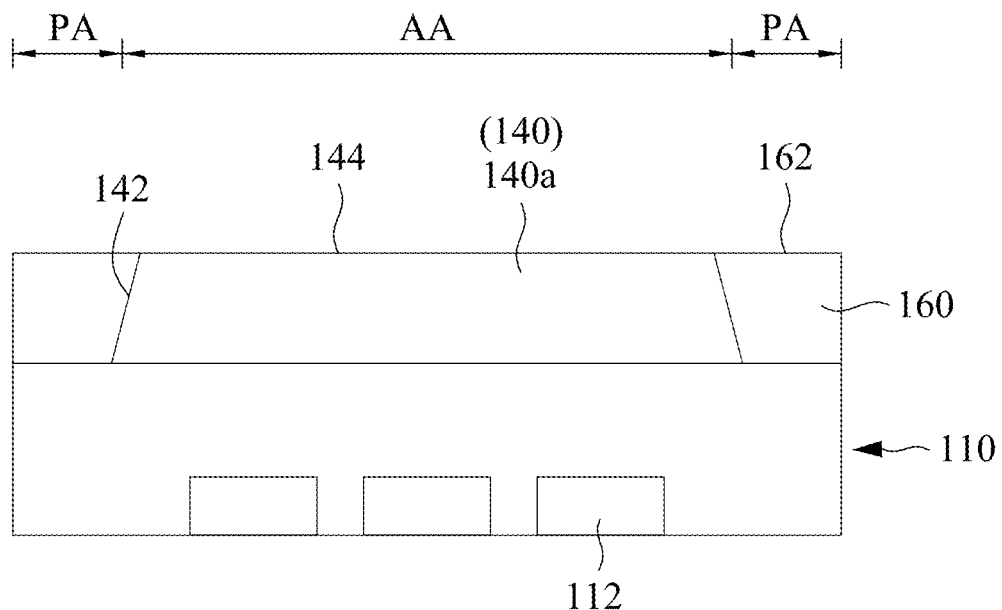

As shown in FIG. 1C and FIG. 1D, a refill layer 160 is formed on the substrate 110 and surrounding the first portion 140a of the lens layer 140. In other word, the refill layer 160 is filled in the area without the first portion 140a of the lens layer 140. A top surface 144 of the first portion 140a of the lens layer 140 is substantially coplanar with a top surface 162 of the refill layer 160. Specifically, the refill layer 160 covers and contacts the inclined sidewall 142 of the lens layer 140. In some embodiments, a material of the refill layer 160 may be a photoresist, such as a transparent photoresist. In some embodiments, the pattern of the refill layer 160 may be performed by a lithography process. The lithography process makes a flat topography such that the lens layer 140 has a uniform first portion 140a. A deposition thickness of the refill layer 160 could be adjusted according to the thickness of the first portion 140a of the lens layer 140.

Figure 1E:
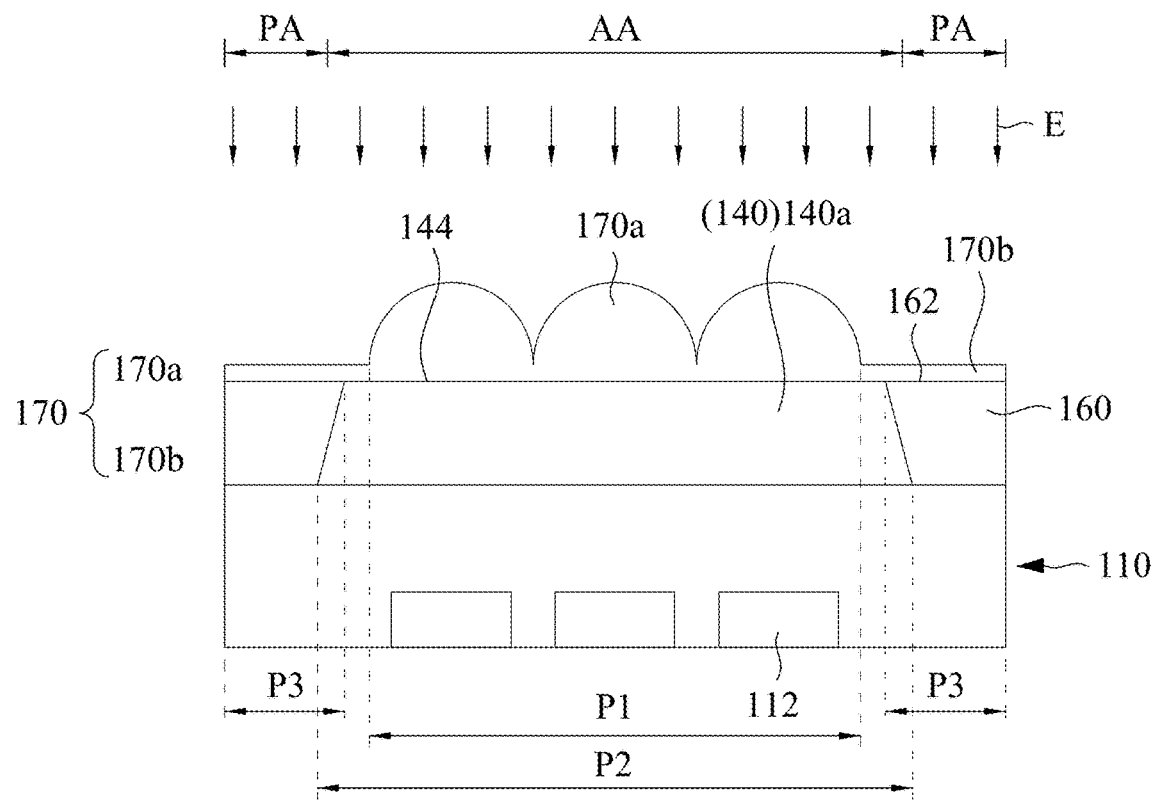

As shown in FIG. 1D and FIG. 1E, a patterned hard mask layer 170 is formed on the first portion 140a of the lens layer 140. Specifically, the patterned hard mask layer 170 has a first portion 170a with hemispherical profiles and a second portion 170b under the first portion 170a. The second portion 170b is a planer film disposed on the top surface 144 of the first portion 140a of the lens layer 140 and the top surface 162 of the refill layer 160. The first portion 170a of the patterned hard mask layer 170 has a surface profile of a micro-lens array. In some embodiments, a material of the patterned hard mask layer 170 may be a photoresist. In some embodiments, the pattern of the patterned hard mask layer 170 may be formed by a lithography process. In some embodiments, the positions of first portion 170a may be firstly defined, and then forming the hemispherical profiles. As shown in FIG. 1E, each of the hemispherical profiles of the patterned hard mask layer 170 corresponds to each of the photosensitive elements 112. It could be understood that the number of hemispherical profiles and the number of the photosensitive elements 112 are merely illustrated for clarity and is not intended to limit the present disclosure.

Figure 1F:
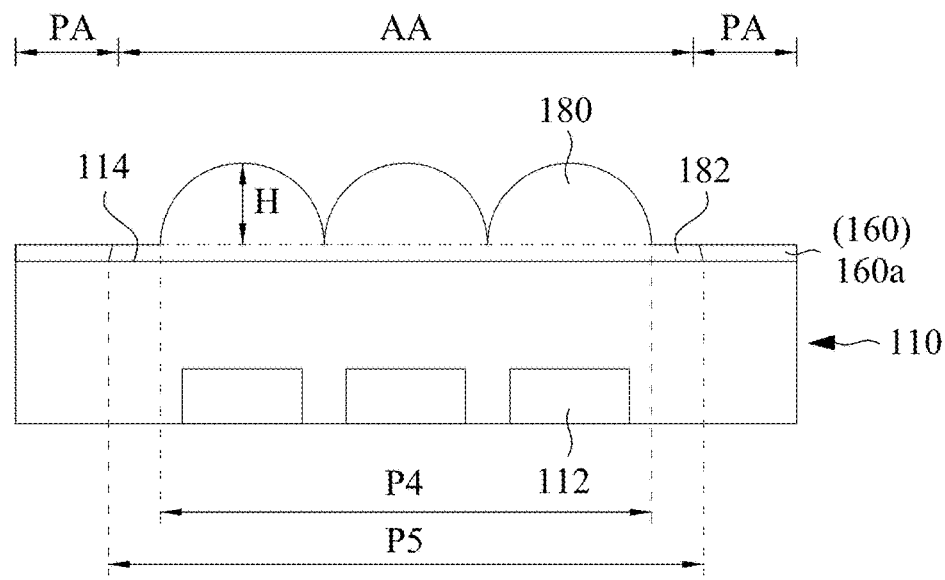

As shown in FIG. 1E and FIG. 1F, the lens layer 140 is etched to transfer a pattern of the patterned hard mask layer 170 (including the first portion 170a and the second portion 170b) to the lens layer 140 such that a plurality of lenses 180 are defined. The lens layer 140 is etched by an etching process E. Specifically, in the etching process E, the refill layer 160 is also etched to transfer the pattern of the second portion 170*b* of the patterned hard mask layer 170 to the refill layer 160 such that the plurality of lenses 180 has an underlying layer 182 and a remaining portion 160*a* of the refill layer 160 is defined. The underlying layer 182 is disposed between the lenses 180 and the substrate 110. The underlying layer 182 is disposed between the lenses 180 and the substrate 110, and the underlying layer 182 connects to the remaining portion 160*a* of the refill layer 160. Since the lenses 180 and the underlying layer 182 are formed by etching the lens layer 140, the materials of the lenses 180 and the underlying layer 182 are the same as the material of the lens layer 140, for example, inorganic material (such as a-Si, SiH, GeH, Ge, GeO, or GeSiH). In such embodiment, the refill layer 160 and the underlying layer 182 could also be used as protection layers to prevent the substrate 110 below from being damaged during the etching process E.

In some embodiments, the etching process E is a dry etching process. In some embodiments, a thickness of the remaining portion 160*a* of the refill layer 160 is in a range from 0.1 µm to 100 µm, such as 10, 20, 50, or 80 µm. A thickness of the underlying layer 182 may be adjusted by the focal length in the etching process E. In some embodiments, the thickness of the underlying layer 182 is in a range from 0.01 µm to 100 µm, such as 0.1, 1, 10, 20, 50, or 80 µm. In some embodiments, the thickness of the remaining portion 160*a* is similar to a thickness of the underlying layer 182. In some embodiments, the thickness of the remaining portion 160*a* is the same as the thickness of the underlying layer 182. In some embodiments, the thickness of the remaining portion 160*a* is slightly thinner than the thickness of the underlying layer 182.

Still refer to FIG. 1F. The underlying layer 182 is a planer film disposed on the top surface 114 of the substrate 110. The lenses 180, the underlying layer 182, and the remaining portion 160*a* are all disposed on the top surface 114 of the substrate 110. In such embodiment, the lenses 180 are micro-lenses. In some embodiments, a diameter/width of the micro-lenses 180 is in a range from 1 µm to 100 µm. In some embodiments, a height H of the micro-lenses 180 is in a range from 0.1 µm to 50 µm. Since the patterned hard mask layer 170 has the surface profile of the micro-lens array, the lenses 180 also have the surface profile of the micro-lens array. The lenses 180 are disposed above the photosensitive elements 112, and each of the lenses 180 corresponds to each of the photosensitive elements 112.

Please refer to FIG. 1E again. A projection P1 of the first portion 170*a* of patterned hard mask layer 170 on the substrate 110 is in a projection P2 of the first portion 140*a* of the lens layer 140 on the substrate 110. The projection P2 of the first portion 140*a* of the lens layer 140 on the substrate 110 overlaps a projection P3 of the refill layer 160 on the substrate 110. As shown in FIG. 1F, the underlying layer 182 protrudes from the bottoms of peripheral lenses 180. In other words, a projection P4 of the lenses 180 on the substrate 110 is in a projection P5 of the underlying layer 182 on the substrate 110.

FIG. 1G to FIG. 1L are a series of cross-sectional views of the manufacturing method for the image sensor 1000A after FIG. 1F. It could be understood that the lens array area AA is still an area that includes a plurality of lenses (including micro-lenses or meta-surface lenses), and the periphery area PA is an area without lenses.

As shown FIG. 1F and FIG. 1G, a cladding layer 192 is formed to cover the plurality of lenses 180 and the substrate 110. Specifically, the cladding layer 192 is arranged in both the lens array area AA and the periphery area PA. The cladding layer 192 covers top surfaces 184 of the lenses 180, a top surface 162 and a side surface 164 of the remaining portion 160*a*, and the top surface 114 of the substrate 110. The cladding layer 192 has a planar top surface 193.

As shown in FIG. 1G and FIG. 1H, a portion of the cladding layer 192 is etched to expose a portion 110*a* of the substrate 110 and form the inclined sidewall 194. In some embodiments, the inclined sidewall 194 is formed by a lithography process and an etching process. In some embodiments, an angle θ3 between the inclined sidewall 194 and the top surface 114 of the substrate 110 is in a range from 20 degrees to 60 degrees, such as 30, 40, or 50 degrees. In some embodiments, a distance D1 between an outermost of the inclined sidewall 194 to an outermost of the underlying layer 182 is in a range from 20 µm to 50 µm, such as 30 or 40 µm. It should be understood that the "outermost" herein is a direction toward the periphery area PA.

As shown in FIG. 1H and FIG. 1I, a cladding layer 196 is formed on the cladding layer 192 and the portion 110*a* of the substrate 110 to form an inclined sidewall 197 on a top of the cladding layer 192. Specifically, the cladding layer 196 is lining on the cladding layer 192 so that the cladding layer 196 has the inclined sidewall 197 above the inclined sidewall 194 of the cladding layer 192.

As shown in FIG. 1I and FIG. 1J, a portion of the cladding layer 196 is etched to form the inclined sidewall 198 on a bottom of the cladding layer 196. In some embodiments, the inclined sidewall 198 is formed by a lithography process and an etching process. The inclined sidewall 197 is above the inclined sidewall 198. In some embodiments, an angle θ4 between the inclined sidewall 198 and a top surface 114 of the substrate 110 is in a range from 20 degrees to 60 degrees, such as 30, 40, or 50 degrees. In some embodiments, a distance D2 between an outermost of the inclined sidewall 198 to an outermost of the inclined sidewall 197 is in a range from 20 µm to 50 µm, such as 30 or 40 µm. In some embodiments, a distance D3 between the outermost of the inclined sidewall 198 to the outermost of the underlying layer 182 is in a range from 40 µm to 100 µm, such as 50, 60, 70, 80, or 90 µm. In some embodiments, a projection P6 of the inclined sidewall 197 of the cladding layer 196 on the substrate 110 is spaced apart from a projection P7 of the inclined sidewall 198 of the cladding layer 196 on the substrate 110. In some embodiments, a width of the cladding layer 196 is greater than a width of the cladding layer 192. In some embodiments, a material of the cladding layer 192 and/or the cladding layer 196 may be transparent polymer or dielectric, such as resin, spin on glass, silicon dioxide, etc. In other words, each of the cladding layer 192 and the cladding layer 196 can be a polymer layer and/or a dielectric layer. In some embodiments, the cladding layer 192 and/or the cladding layer 196 may be formed by a spin-on process or other suitable coating processes.

As shown in FIG. 1J and FIG. 1K, a photoresist layer 2000 and a bandpass filter layer 2100 are formed on the substrate 110. Specifically, the bandpass filter layer 2100 includes a first portion 2100*a* and a second portion 2100*b*. The first portion 2100*a* of the bandpass filter layer 2100 is conformally disposed on the cladding layer 196 and the top surface 114 of the substrate 110. The second portion 2100*b* of the bandpass filter layer 2100 is disposed on the photoresist layer 2000. The second portion 2100*b* surrounds and seals the cladding layer 196. In some embodiment, a material of the photoresist layer 2000 may be a positive-type photoresist or a negative-type photoresist. In some embodiment, the pattern of the photoresist layer 2000 may be formed by a lithography process. The photoresist layer 2000 has an obtuse angle between an inclined sidewall 2002 of the photoresist layer 2000 and the top surface 114 of the substrate 110.

Please refer to FIG. 1K again. It could be understood that the first portion 2100a and the second portion 2100b of the bandpass filter layer 2100 are formed at the same time. The bandpass filter layer 2100 includes multiple films and each film may be formed by PVD or other suitable deposition process. In some embodiments, a material of the bandpass filter layer 2100 includes a-Si, $SiO_2$, SiN, $Nb_2O_5$, $GeO_2$, $TiO_2$, etc. In the deposition process of the bandpass filter layer 2100, the photoresist layer 2000 could be used as an eave so that the first portion 2100a adjacent to the photoresist layer 2000 has an inclined sidewall 2102. The first portion 2100a has an acute angle between the inclined sidewall 2102 of the first portion 2100a and the top surface 114 of the substrate 110. As shown in FIG. 1K, an air gap presents between the inclined sidewall 2102 and the inclined sidewall 2002. The design of the bandpass filter layer 2100 could be adjusted depending on the working wavelength of the image sensor.

As shown in FIG. 1K and FIG. 1L, in some embodiments, the photoresist layer 2000 and the second portion 2100b of the bandpass filter layer 2100 are removed by a lift-off process. As a result, the image sensor 1000A having microlenses 180, the underlying layer 182, and the remaining portion 160a of the refill layer 160 are formed, as shown in FIG. 1L. The lenses 180 are configured to receive external light. In some embodiments, a refractive index of the cladding layer 196 and/or the cladding layer 192 is in a range from 1.1 to 1.6, such as 1.2, 1.3, 1.4, or 1.5. In some embodiments, a refractive index of the lenses 180 is in a range from 1.7 to 4.5, such as 2.5, 3.3, or 3.8. In some embodiments, the refractive index of the cladding layer 196 and/or the cladding layer 192 is between the refractive index of the lenses 180 and the refractive index of air.

The refractive index difference between the cladding layer 196 and the lenses 180 is large, thereby providing well performance for the image sensor 1000A. Since the cladding layers have inclined sidewalls, the first portion 2100a of the bandpass filter layer 2100 also has inclined sidewalls. The inclined sidewalls (such as the inclined sidewalls 197, 198) of the cladding layers make the edges of the cladding layers to be smooth, so the cladding layers have better coverage by the bandpass filter layer 2100 having multiple films. In addition, the inclined sidewalls of the bandpass filter layer 2100 help to reduce the stress at the boundaries of multiple films of bandpass filter layer 2100, thereby avoiding the delamination between different materials. In other words, a thickness of the image sensor 1000A from the lens array area AA to the periphery area PA is gradually decreased. The image sensor 1000A has a flat topography and could prevent a stress imbalance on the edges of the multiple films between a micro-lens array (such as the lenses 180) and elements disposed above the micro-lens array from wafer bending, thereby providing well optical performances.

Figure 2C:
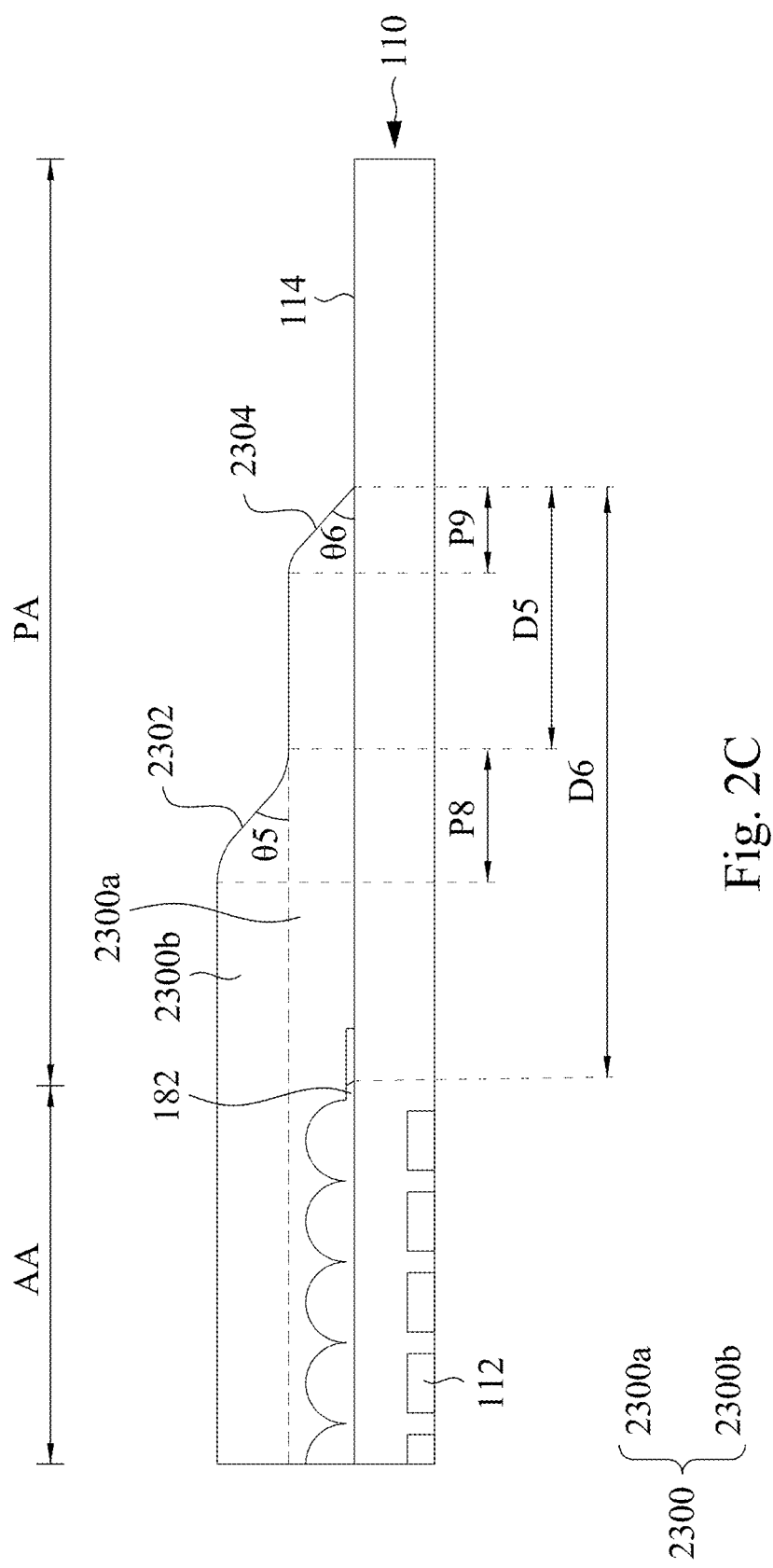

FIG. 2A to FIG. 2C are a series of cross-sectional views of manufacturing a cladding layer of the image sensor 1000A of FIG. 1L in accordance with alternative embodiments of the present disclosure. Specifically, the manufacturing operations from FIG. 1G to FIG. 1J could be replaced by the manufacturing operations from FIG. 2A to FIG. 2C.

As shown in FIG. 1F and FIG. 2A, a cladding layer 2300 is formed to cover the plurality of lenses 180 and the substrate 110. A thickness of the cladding layer 2300 in FIG. 2A may be greater than a thickness of the cladding layer 192 in FIG. 1G. A material of the cladding layer 2300 may be the same as the material of the cladding layer 192 and/or the cladding layer 196.

As shown in FIG. 2A and FIG. 2B, a portion of the cladding layer 2300 is etched to form an inclined sidewall 2302 on a top of the cladding layer 2300. In some embodiments, an angle θ5 between the inclined sidewall 2302 and the top surface 114 of the substrate 110 is in a range from 20 degrees to 60 degrees, such as 30, 40, or 50 degrees. In some embodiments, an etching depth d of the inclined sidewall 2302 may be one-half, one-third or two-thirds of a total thickness of the cladding layer 2300 depending on the length of the inclined sidewall 2302. In some embodiments, a distance D4 between an outermost of the inclined sidewall 2302 to the outermost of the underlying layer 182 is in a range from 20 µm to 50 µm, such as 30 or 40 µm.

As shown in FIG. 2B and FIG. 2C, a portion of the cladding layer 2300 is etched to form the inclined sidewall 2304 on a bottom of the cladding layer 2300. In some embodiments, an angle θ6 between the inclined sidewall 2304 and the top surface 114 of the substrate 110 is in a range from 20 degrees to 60 degrees, such as 30, 40, or 50 degrees. In some embodiments, a distance D5 between an outermost of the inclined sidewall 2304 to the outermost of the inclined sidewall 2302 is in a range from 20 µm to 50 µm, such as 30 or 40 µm. In some embodiments, a distance D6 between the outermost of the inclined sidewall 2304 to the outermost of the underlying layer 182 is in a range from 40 µm to 100 µm, such as 50, 60, 70, 80, or 90 µm.

Please refer to FIG. 2C again. The cladding layer 2300 could be understood as being made by a first cladding layer 2300a and a second cladding layer 2300b. The second cladding layer 2300b is disposed on the first cladding layer 2300a. The first cladding 2300a has the inclined sidewall 2304 and the second cladding layer 2300b has the inclined sidewall 2302. A width of the first cladding layer 2300a is greater than a width of the second cladding layer 2300b. The inclined sidewall 2302 of the second cladding layer 2300b is above the inclined sidewall 2304 of the first cladding layer 2300a. A projection P8 of the inclined sidewall 2302 of the second cladding layer 2300b on the substrate 110 is spaced apart from a projection P9 of the inclined sidewall 2304 of the first cladding layer 2300a on the substrate 110.

After the cladding layer 2300 in FIG. 2C is formed, the operations from FIG. 1K to FIG. 1L are continued to perform so that the image sensor 1000A in FIG. 1L is formed.

The manufacturing for the cladding layer 196 or the cladding 2300 of the image sensor 1000A (also the image sensors 1000B~1000C, 8000A~8000D) may be performing by the operations from FIG. 1G to FIG. 1J or the operations from FIG. 2A to FIG. 2C. The inclined sidewalls of the cladding layer 196 and the cladding layer 2300 could be formed by 2 times lithography process and 2 times etching process to smooth the edges of the cladding. Therefore, the inclined sidewalls could provide a smoother slope to reduce the stress in corners of multiple films of the bandpass filter layer 2100 (please refer to FIG. 1L).

FIG. 3A to FIG. 3F are a series of cross-sectional views of a manufacturing method for an image sensor 1000B in accordance with some embodiments of the present disclosure. FIG. 4 is a cross-sectional view of the image sensor 1000B in accordance with the manufacturing method illustrated in FIG. 3A to FIG. 3F. The manufacturing method for the image sensor 1000B includes the operations from FIG. 1A to FIG. 1L and FIG. 2A to FIG. 2C as mentioned above, in which the manufacturing for the cladding may be the operations from FIG. 1G to FIG. 1J or the operations from FIG. 2A to FIG. 2C. Reference numerals are repeated herein to show the same or similar features shown in the drawings above, the description above applies equally to the embodiments described below, and the details thereof are not repeatedly described.

Figure 3A:
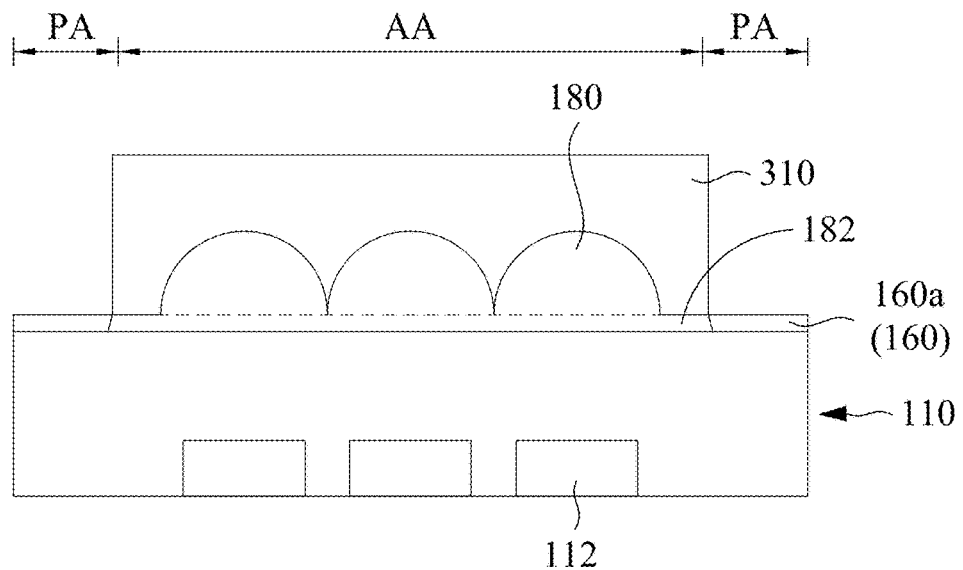
FIG. 3A to FIG. 3F are a series of cross-sectional views of a manufacturing method for an image sensor in accordance with some embodiments of the present disclosure.
Figure 4:
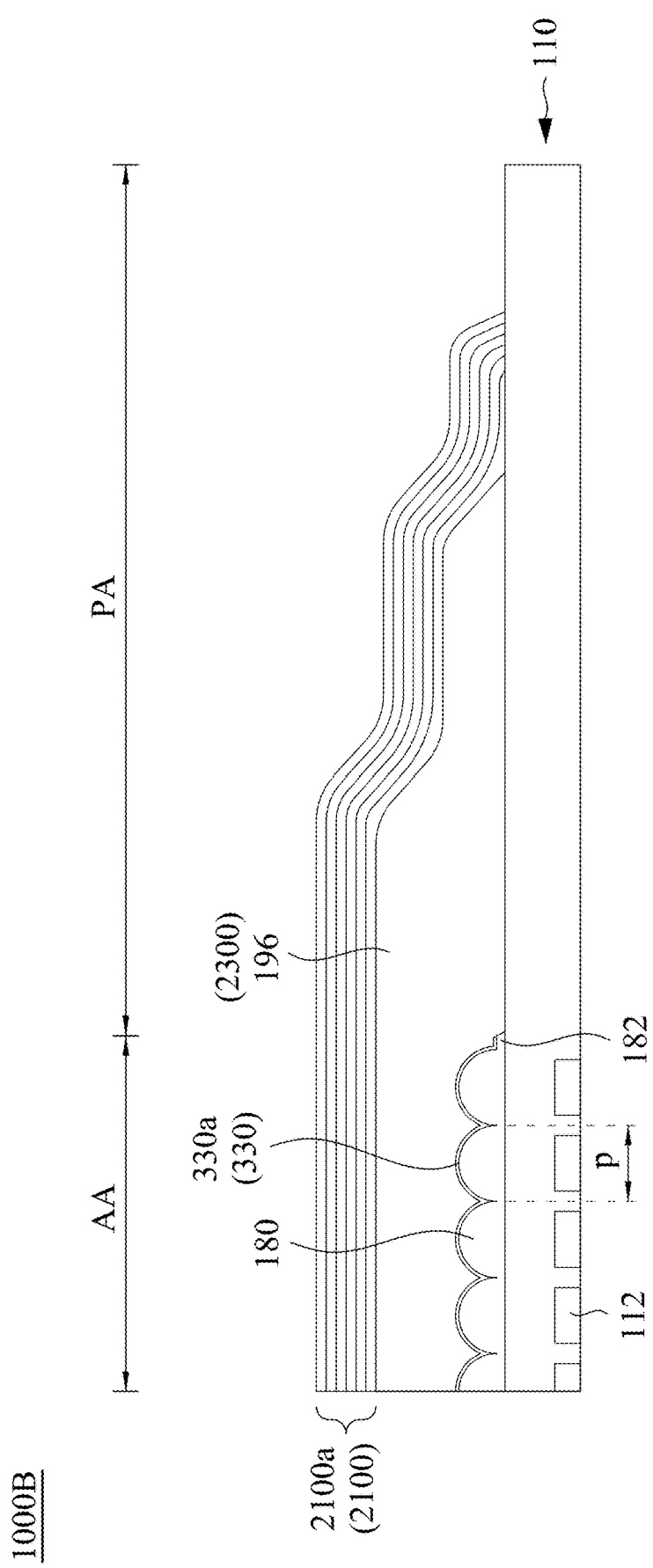
FIG. 4 is a cross-sectional view of an image sensor in accordance with the manufacturing method illustrated in FIG. 3A to FIG. 3F.

As shown in FIG. 1F and FIG. 3A, after the lenses 180 with the underlying layer 182 and the remaining portion 160a of the refill layer 160 are defined, a protection layer 310 is formed to cover the lenses 180 and expose the remaining portion 160a of the refill layer 160. Specifically, the protection layer 310 is formed in the lens array area AA. In some embodiments, the pattern of the protection layer 310 may be formed by a lithography process. In some embodiments, a material of the protection layer 310 may be a photoresist of positive or negative type.

Figure 3B:
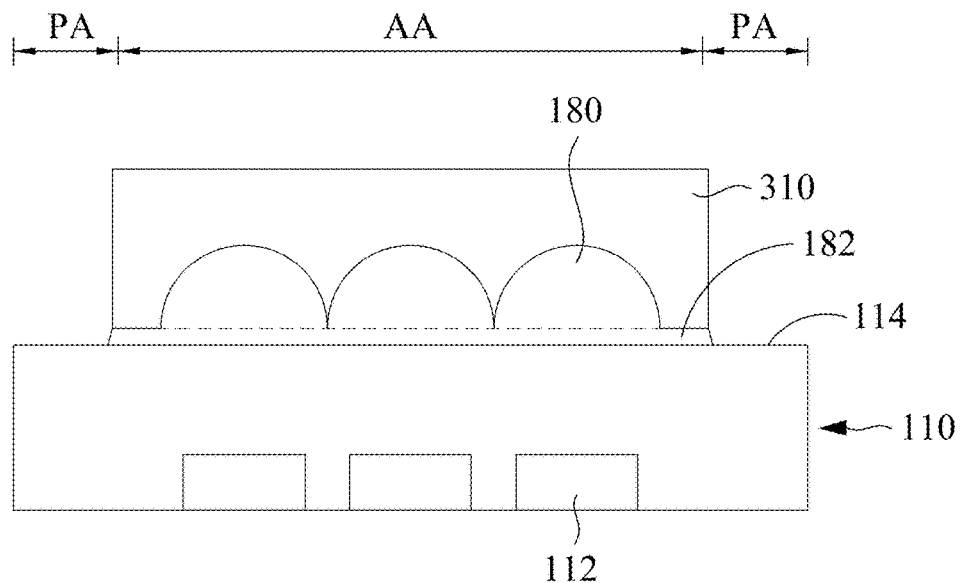

As shown in FIG. 3A and FIG. 3B, the remaining portion 160a of the refill layer 160 is removed. The top surface 114 of the substrate 110 is exposed. In some embodiments, the remaining portion 160a is removed by a dry etching process.

Figure 3C:
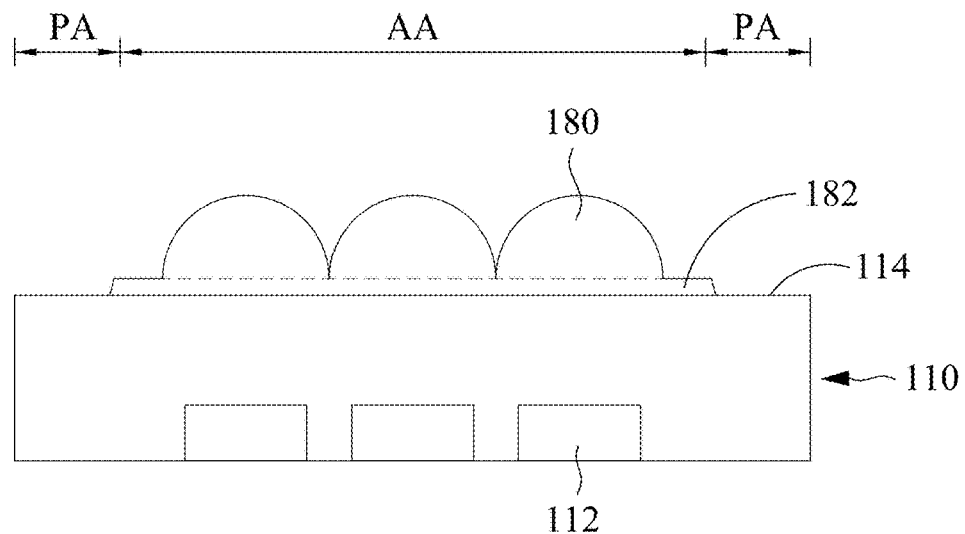

As shown in FIG. 3B and FIG. 3C, the protection layer 310 is removed so that the lenses 180 and the underlying layer 182 are exposed.

Figure 3D:
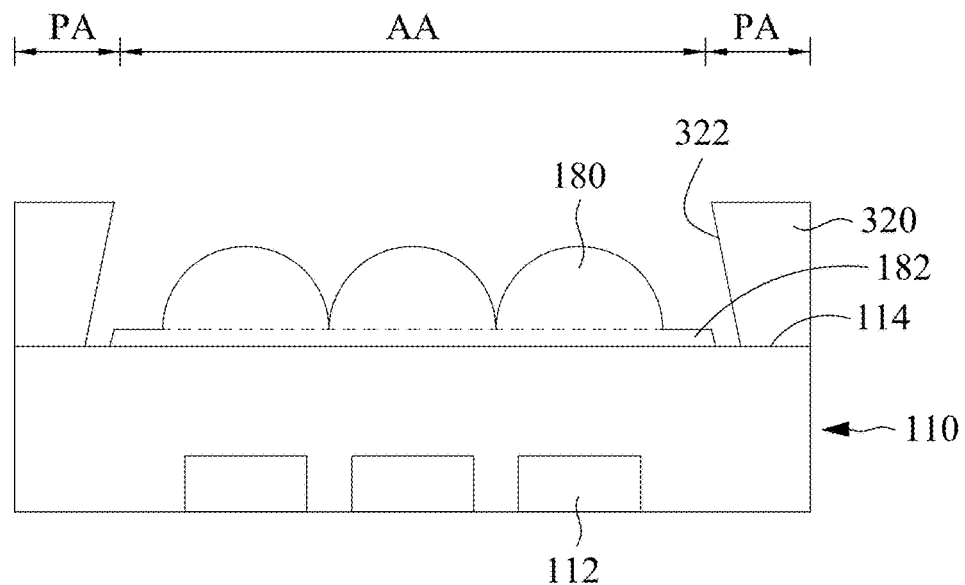

As shown in FIG. 3C and FIG. 3D, a photoresist layer 320 is formed on the top surface 114 of the substrate 110. Specifically, the photoresist layer 320 is formed in the periphery area PA and surrounds the lenses 180 and the underlying layer 182. The photoresist layer 320 has an obtuse angle between an inclined sidewall 322 of the photoresist layer 320 and the top surface 114 of the substrate 110. The formation and the material of the photoresist layer 320 may be the same or similar to the photoresist layer 120 in FIG. 1A.

Figure 3E:
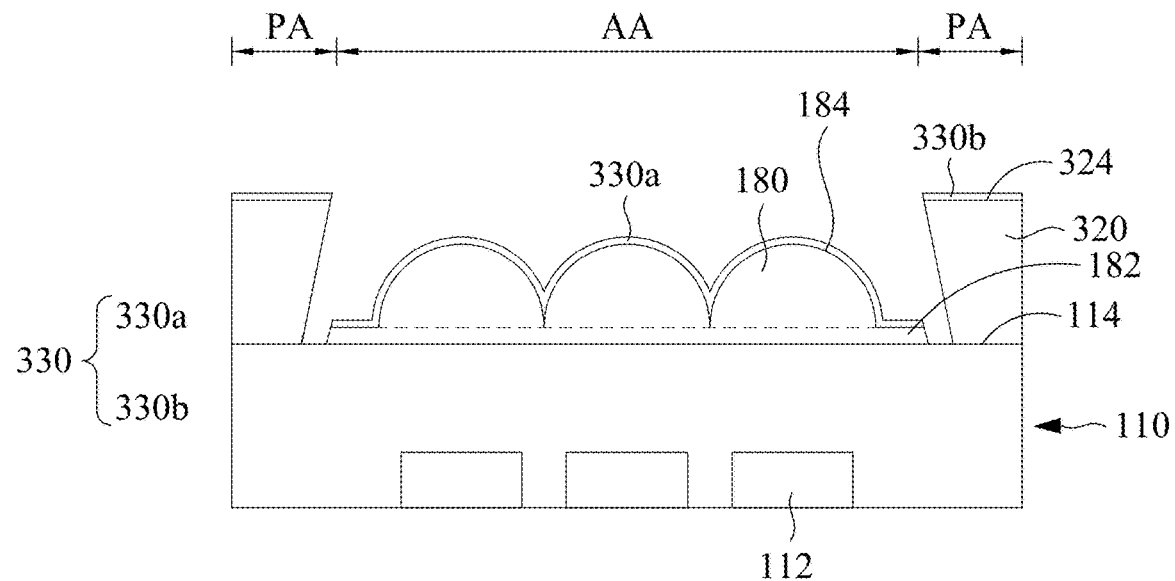

As shown in FIG. 3D and FIG. 3E, an anti-reflective film 330 is formed on the top surfaces 184 of the lenses 180. Specifically, the anti-reflective film 330 includes a first portion 330a and a second portion 330b. The first portion 330a is formed on the top surfaces 184 of the lenses 180, and the second portion 330b is formed on a top surface 324 of the photoresist layer 320. It could be understood that the first portion 330a and the second portion 330b of the anti-reflective film 330 are formed at the same time. The anti-reflective film 330 is a thin film lining on the lenses 180. In some embodiments, the anti-reflective film 330 may be formed by a physical vapor deposition (PVD) or other suitable deposition process.

Figure 3F:
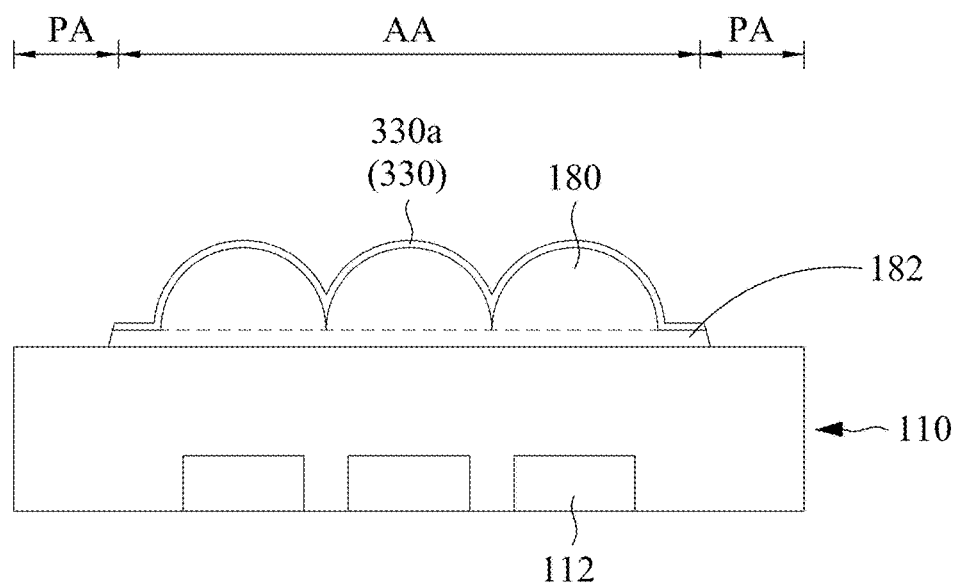

As shown in FIG. 3E and FIG. 3F, the photoresist layer 320 and the second portion 330b of the anti-reflective film 330 are removed from the periphery area PA. In some embodiments, the remove process is performed by a lift-off process. The lift-off process of the present disclosure could reduce the film stress to avoid stress imbalance and wafer bending.

After the lenses 180 with the first portion 330a of the anti-reflective film 330 are formed, the operations from FIG. 1G to FIG. 1L or the operations from FIG. 2A to FIG. 2C are continued to perform so that the image sensor 1000B in FIG. 4 is formed.

FIG. 5A to FIG. 5F are a series of cross-sectional views of a manufacturing method for an image sensor 1000C in accordance with some embodiments of the present disclosure. FIG. 6 is a cross-sectional view of the image sensor 1000C in accordance with the manufacturing method illustrated in FIG. 5A to FIG. 5F. The manufacturing method for the image sensor 1000C includes the operations from FIG. 1A to FIG. 1L and FIG. 2A to FIG. 2C as mentioned above, in which the manufacturing for the cladding may be the operations from FIG. 1G to FIG. 1J or the operations from FIG. 2A to FIG. 2C.

Figure 5A:
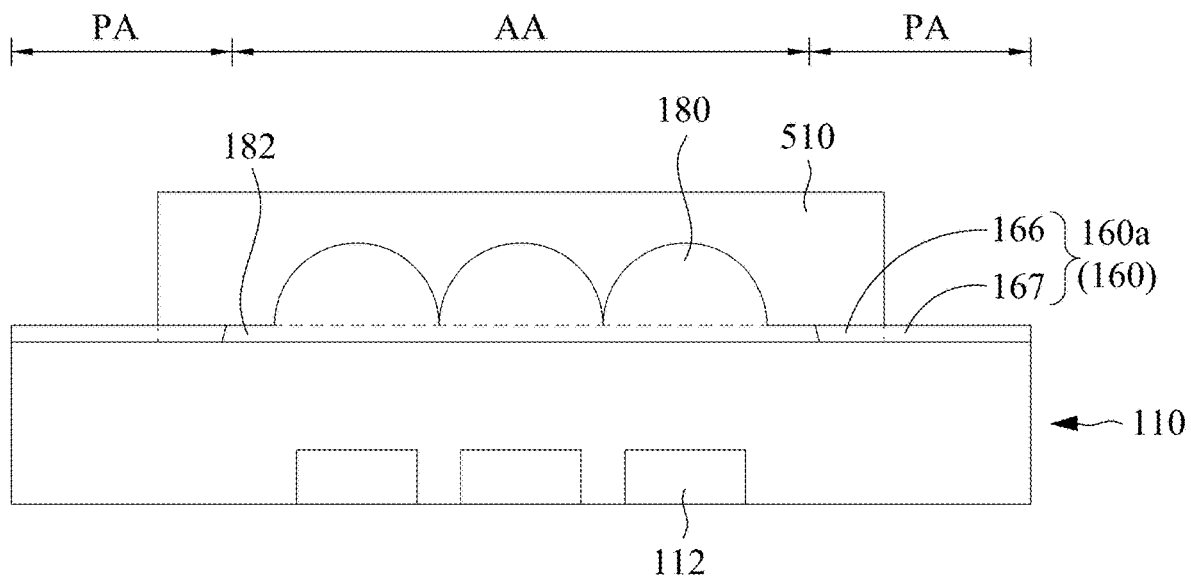
FIG. 5A to FIG. 5F are a series of cross-sectional views of a manufacturing method for an image sensor in accordance with some embodiments of the present disclosure.

As shown in FIG. 1F and FIG. 5A, after the lenses 180 with the underlying layer 182 and the remaining portion 160a of the refill layer 160 are defined, a protection layer 510 is formed to cover the lenses 180 and a first portion 166 of the remaining portion 160a of the refill layer 160, wherein a second portion 167 of the remaining portion 160a of the refill layer 160 is exposed. Specifically, the protection layer 510 is formed in the lens array area AA and a portion of the periphery area PA. The first portion 166 is disposed between the underlying layer 182 and the second portion 167. The formation and the material of the protection layer 510 may be the same or similar to the protection layer 310 in FIG. 3A.

Figure 5B:
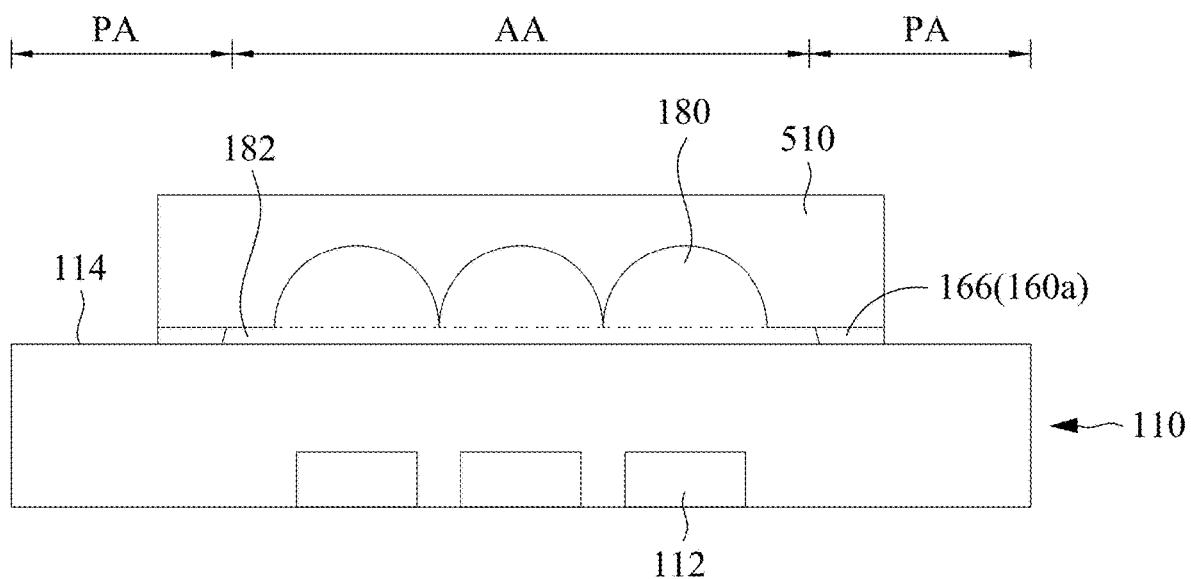

Please refer to FIG. 5A and FIG. 5B, the second portion 167 of the remaining portion 160a of the refill layer 160 is removed and the top surface 114 of the substrate 110 is exposed. In other words, the first portion 166 of the remaining portion 160a is remained between the protection layer 510 and the substrate 110. In some embodiments, the second portion 167 is removed by a dry etching process.

Figure 5C:
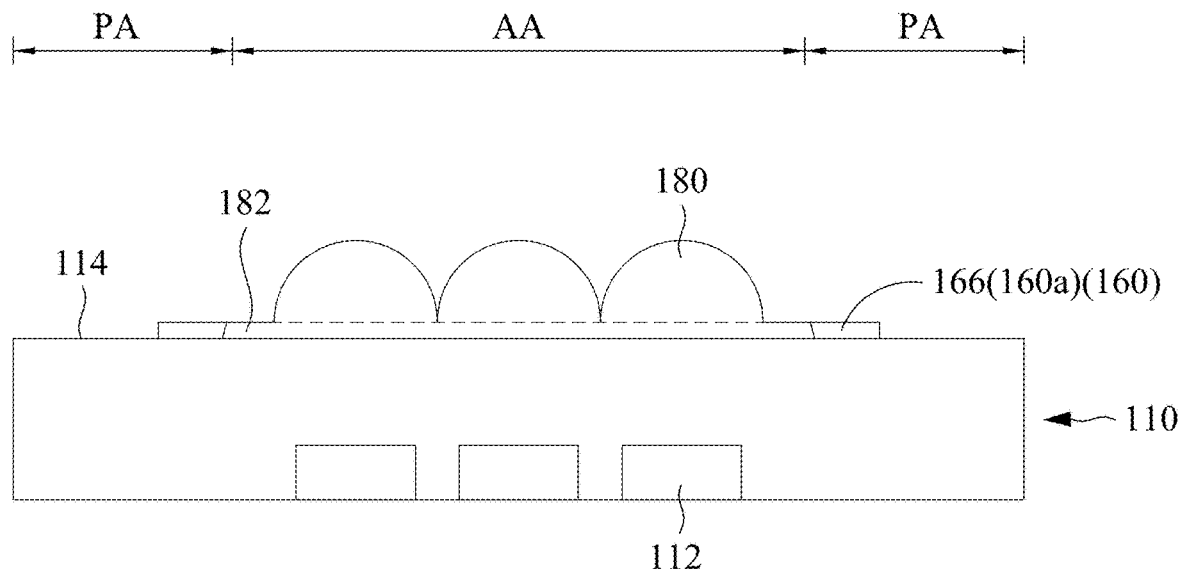

Please refer to FIG. 5B and FIG. 5C, the protection layer 510 is removed so that the lenses 180, the underlying layer 182, and the first portion 166 of the remaining portion 160a are exposed.

Figure 5D:
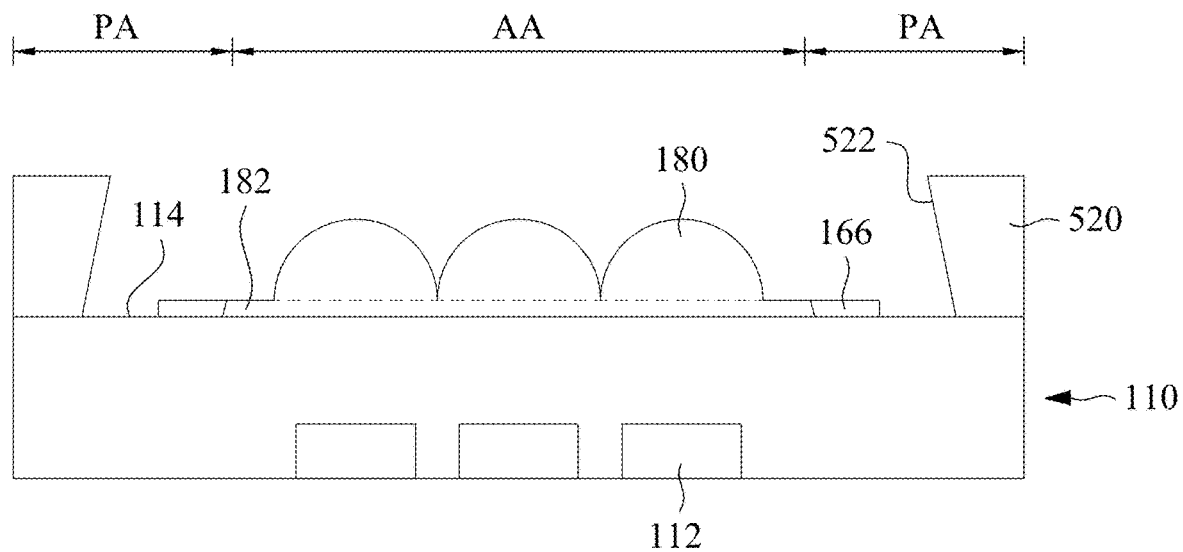

Please refer to FIG. 5C and FIG. 5D, a photoresist layer 520 is formed on the top surface 114 of the substrate 110. Specifically, the photoresist layer 520 is formed in the periphery area PA and surrounds the lenses 180, the underlying layer 182, and the first portion 166. The photoresist layer 520 has an obtuse angle between an inclined sidewall 522 of the photoresist layer 520 and the top surface 114 of the substrate 110. The formation and the material of the photoresist layer 520 may be the same or similar to the photoresist layer 120 in FIG. 1A.

Figure 5E:
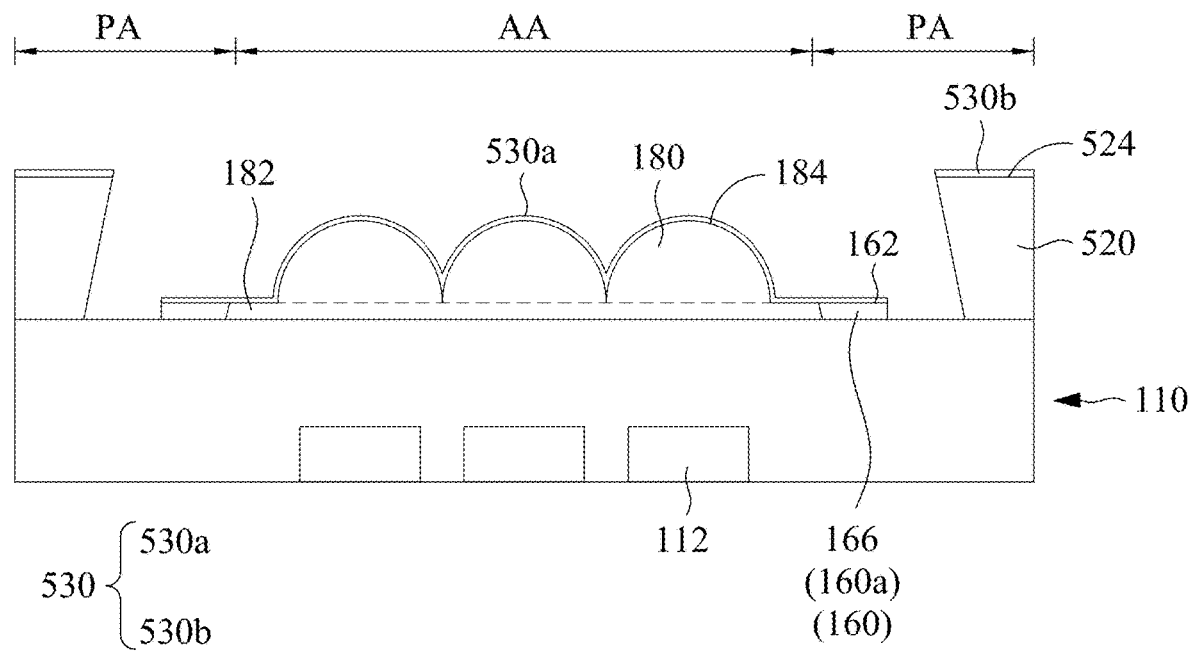

Please refer to FIG. 5D and FIG. 5E, an anti-reflective film 530 is formed on top surfaces 184 of the lenses 180 and a top surface 162 of the first portion 166 of the remaining portion 160a of the refill layer 160. Specifically, the anti-reflective film 530 is also formed on a top surface of the underlying layer 182. The anti-reflective film 530 includes a first portion 530a and a second portion 530b. The first portion 530a is formed on the lenses 180 and the first portion 166, and the second portion 530b is formed on a top surface 524 of the photoresist layer 520. The formation and the material of the anti-reflective film 530 may be the same or similar to the anti-reflective film 330 in FIG. 3E.

Figure 5F:
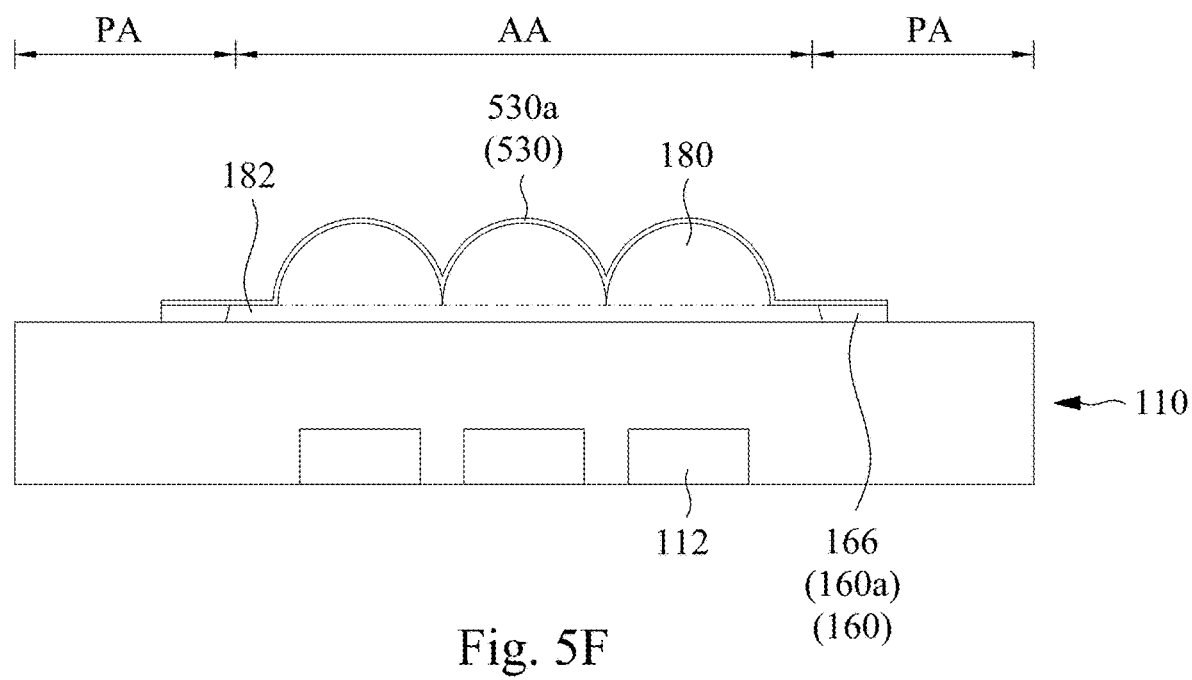

Please refer to FIG. 5E and FIG. 5F, the photoresist layer 520 and the second portion 530b of the anti-reflective film 530 are removed from the periphery area PA. In some embodiments, the remove process is performed by a lift-off process. The lift-off process of the present disclosure could reduce the film stress to avoid stress imbalance and wafer bending.

After the lenses 180 with the first portion 530a of the anti-reflective film 530 are formed, the operations from FIG. 1G to FIG. 1L or the operations from FIG. 2A to FIG. 2C are continued to perform so that the image sensor 1000C in FIG. 6 is formed.

FIG. 7A to FIG. 7E are a series of cross-sectional views of a manufacturing method for an image sensor 8000A in accordance with some embodiments of the present disclosure. FIG. 8 is a cross-sectional view of the image sensor 8000A in accordance with the manufacturing method illustrated in FIG. 7A to FIG. 7E.

Figure 7A:
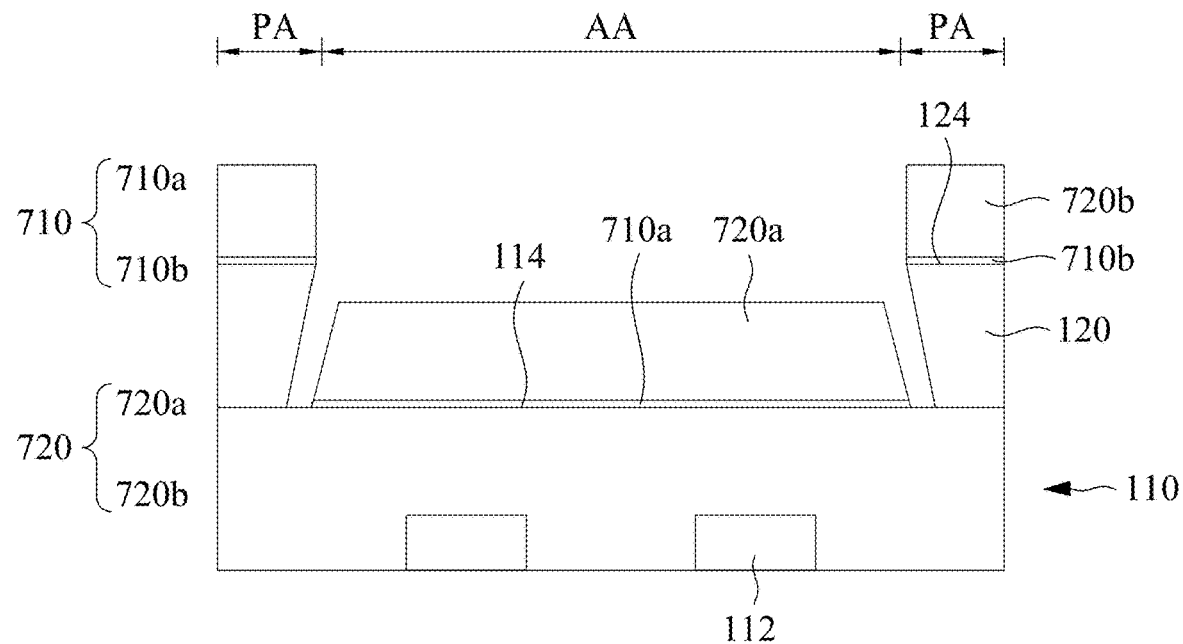
FIG. 7A to FIG. 7E are a series of cross-sectional views of a manufacturing method for an image sensor in accordance with some embodiments of the present disclosure.
Figure 8:
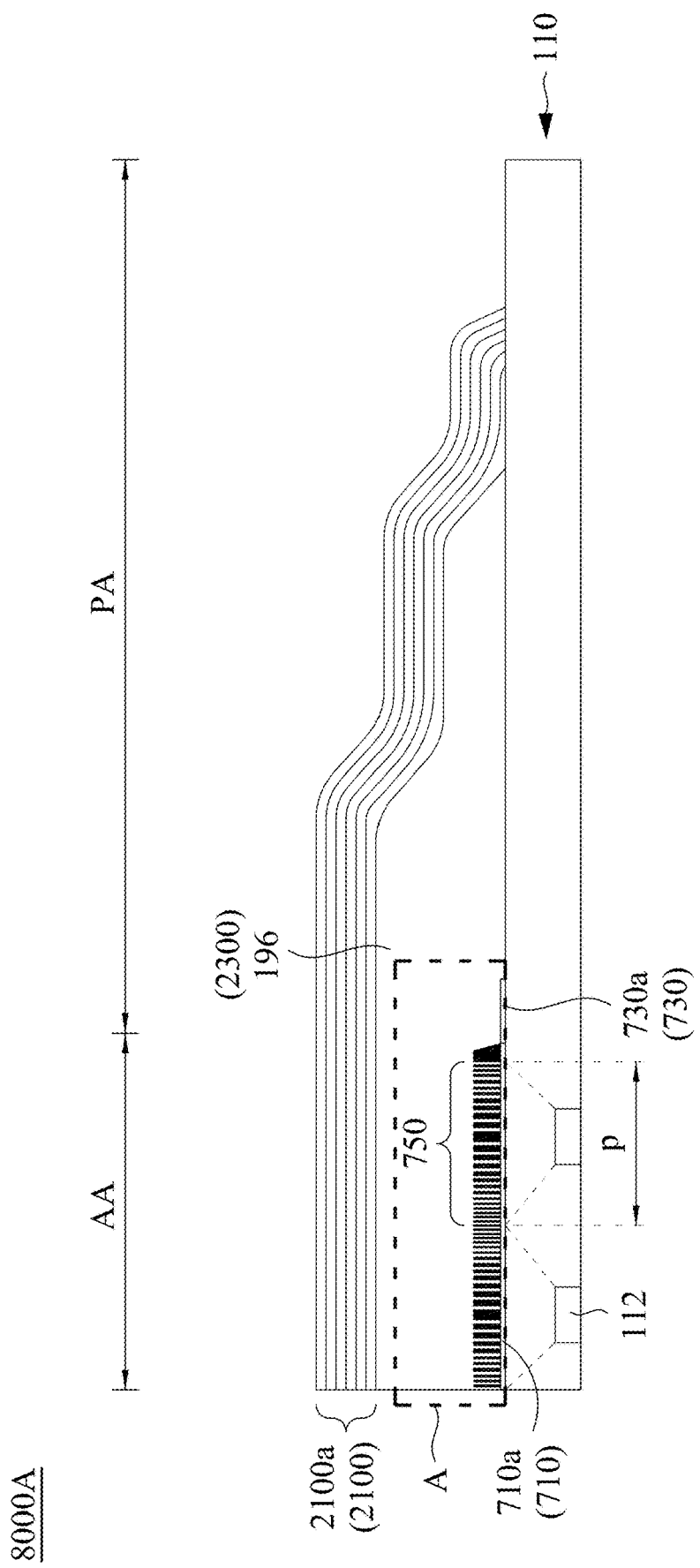
FIG. 8 is a cross-sectional view of an image sensor in accordance with the manufacturing method illustrated in FIG. 7A to FIG. 7E.

As shown in FIG. 7A, the photoresist layer 120 is disposed on the substrate 110. A first portion 710a of an underlying layer 710 is disposed on the top surface 114 of the substrate 110, and a second portion 710b of the underlying layer 710 is disposed on the top surface 124 of the photoresist layer 120. A first portion 720a of a lens layer 720 is disposed on the first portion 710a of the underlying layer 710, and a second portion 720b of the lens layer 720 is disposed on the second portion 710b of the underlying layer 710. In other words, in the lens array area AA, before the lens layer 720 is formed above the substrate 110, the underlying layer 710 is formed on the substrate 110. The underlying layer 710 may be formed by PVD or other suitable deposition process. In some embodiments, a material of the underlying layer 710 is different from the material of the lens layer 720. In some embodiments, a refractive index (n) and an extinction coefficient (k) of the underlying layer 710 are different from those of the lens layer 720. The formation and the material of the lens layer 720 may be the same or similar to the lens layer 140 in FIG. 1B.

Figure 7B:
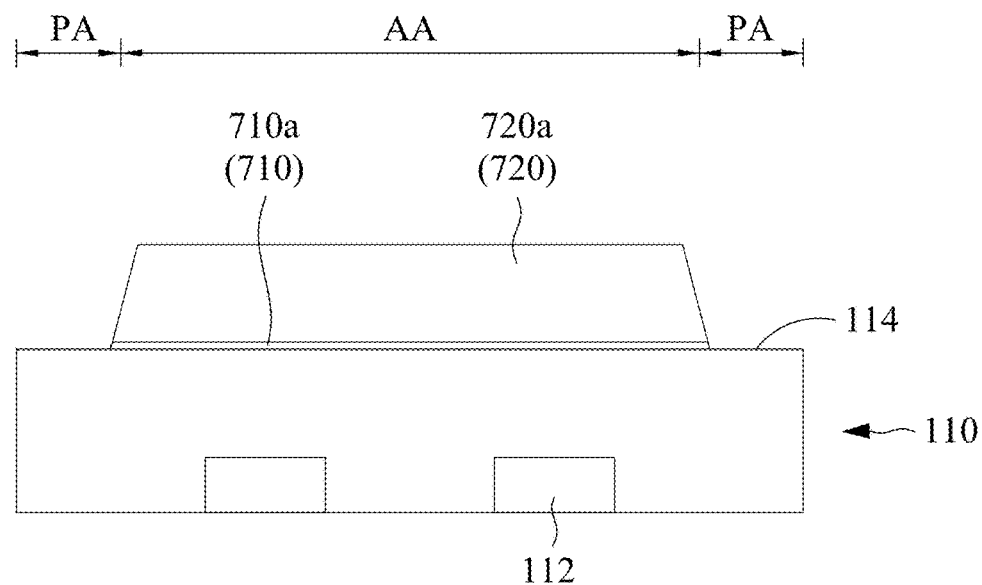

As shown in FIG. 7A and FIG. 7B, the photoresist layer 120 is removed. Specifically, the second portion 710b of the underlying layer 710 and the second portion 720b of the lens layer 720 are also removed. In some embodiments, the remove process is performed by a lift-off process. The lift-off process of the present disclosure could reduce the film stress to avoid stress imbalance and wafer bending.

Figure 7C:
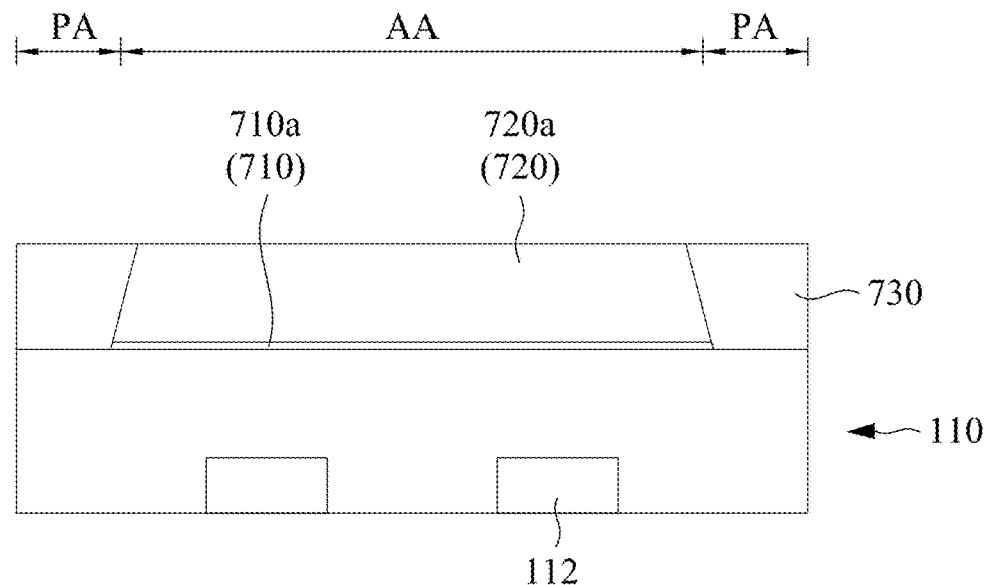

As shown in FIG. 7B and FIG. 7C, a refill layer 730 is formed on the substrate 110 and surrounding the first portion 710a of the underlying layer 710 and the first portion 720a of the lens layer 720. The formation and the material of the refill layer 730 may be the same or similar to the refill layer 160 in FIG. 1D.

Figure 7D:
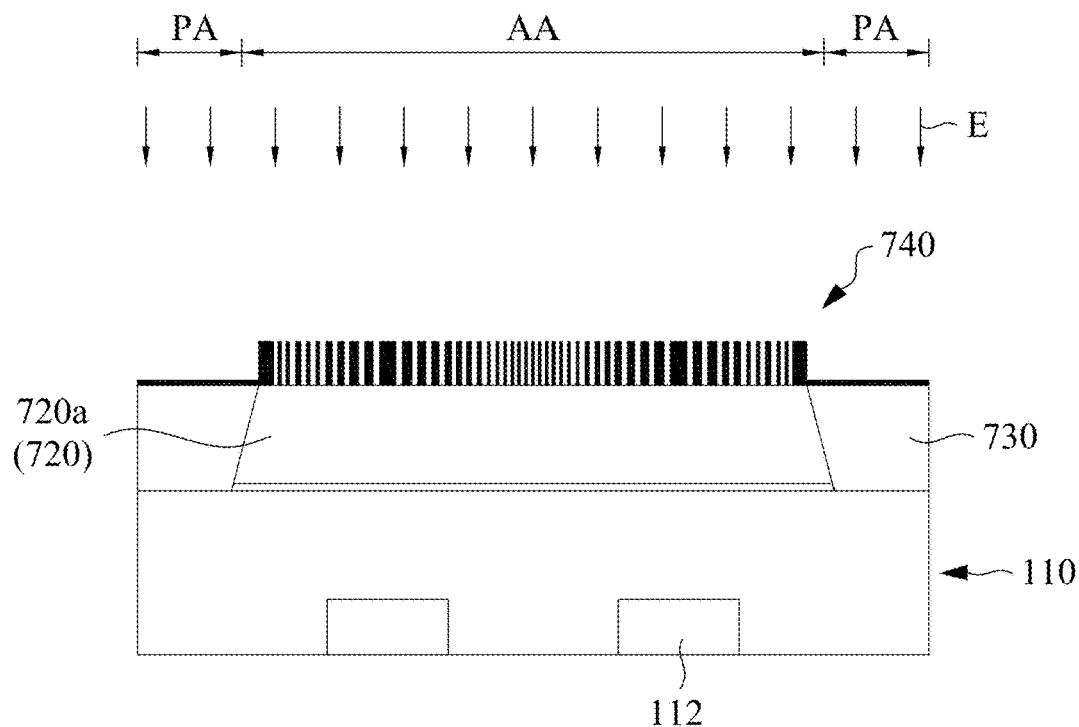

As shown in FIG. 7C and FIG. 7D, a patterned hard mask layer 740 is formed on the first portion 720a of the lens layer 720 and the refill layer 730. Specifically, the patterned hard mask layer 740 has a meta-surface profile on the first portion 720a of the lens layer 720 and a planar film profile on the refill layer 730. The formation and the material of the patterned hard mask layer 740 may be the same or similar to the patterned hard mask layer 170 in FIG. 1E.

Figure 7E:
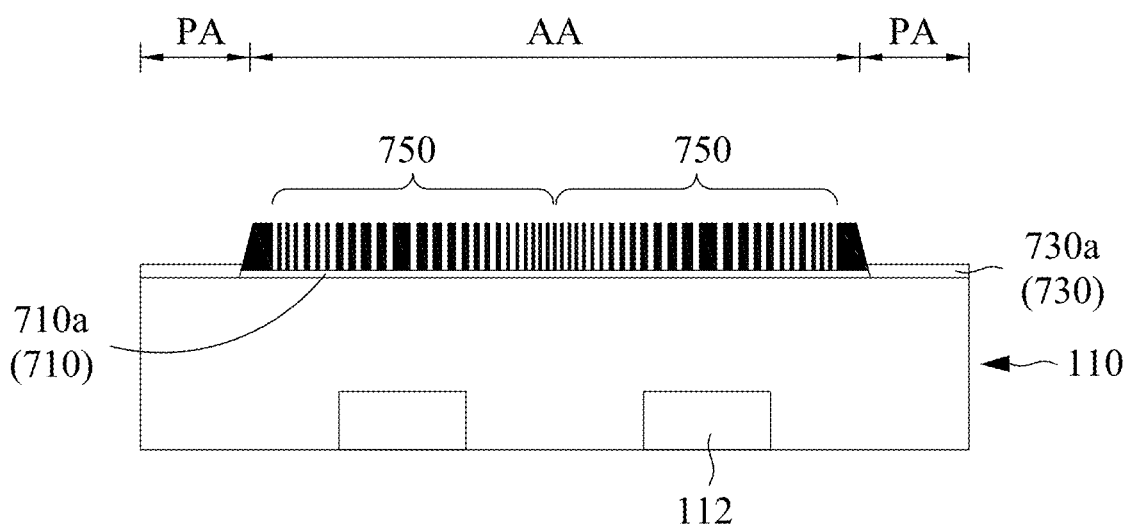

As shown in FIG. 7D and FIG. 7E, the lens layer 720 is etched to transfer a pattern of the patterned hard mask layer 740 (including the meta-surface and the planar film) to the lens layer 720 such that a plurality of lenses 750 are defined. The first portion 710a of the underlying layer 710 could be served as an etching stop layer to protect the substrate 110. In such embodiments, the lenses 750 are meta-surface lenses. The meta-surface lens 750 consists of multiple nanostructures (pillars). The lenses 750 are arranged in a meta-surface array (please refer to FIG. 12). The lens layer 720 is etched by an etching process E. Specifically, in the etching process E, the refill layer 730 is also etched to transfer the pattern of the planar film of the patterned hard mask layer 740 to the refill layer 730 such that a remaining portion 730a of the refill layer 730 is defined. Since the meta-surface of the lenses 750 is formed by etching the lens layer 720, the material of the meta-surface of the lenses 750 is the same as the material of the lens layer 720, for example, inorganic material (such as a-Si, SiH, GeH, Ge, GeO, or GeSiH). In such embodiment, the refill layer 730 and the underlying layer 710 could be used as protection layers to prevent the substrate 110 below from being damaged during the etching process E.

After the lenses 750 with the meta-surface are formed, the operations from FIG. 1G to FIG. 1L or the operations from FIG. 2A to FIG. 2C are continued to perform so that the image sensor 8000A in FIG. 8 is formed.

Figure 9:
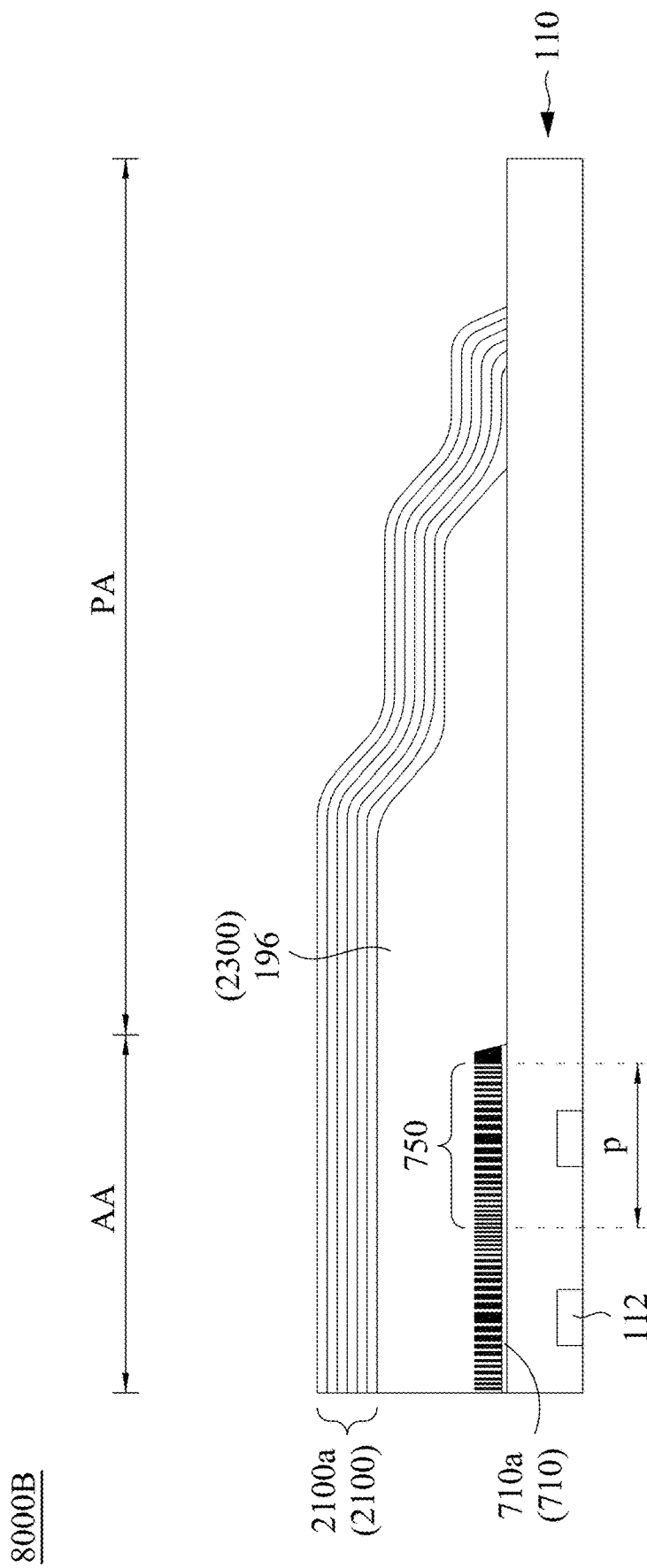
FIG. 9 to FIG. 11 are cross-sectional view of image sensors in accordance with some embodiments of the present disclosure.
Figure 10:
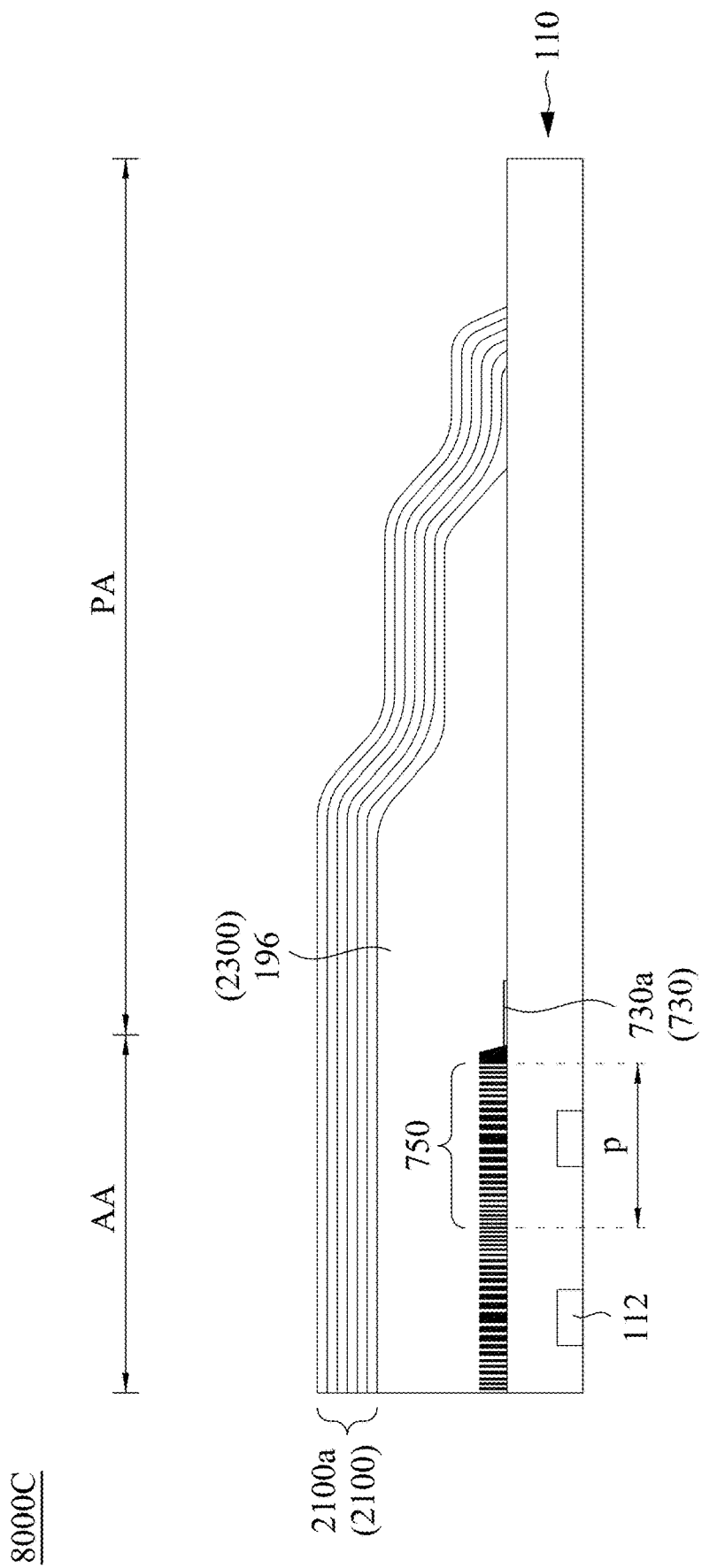
Figure 11:
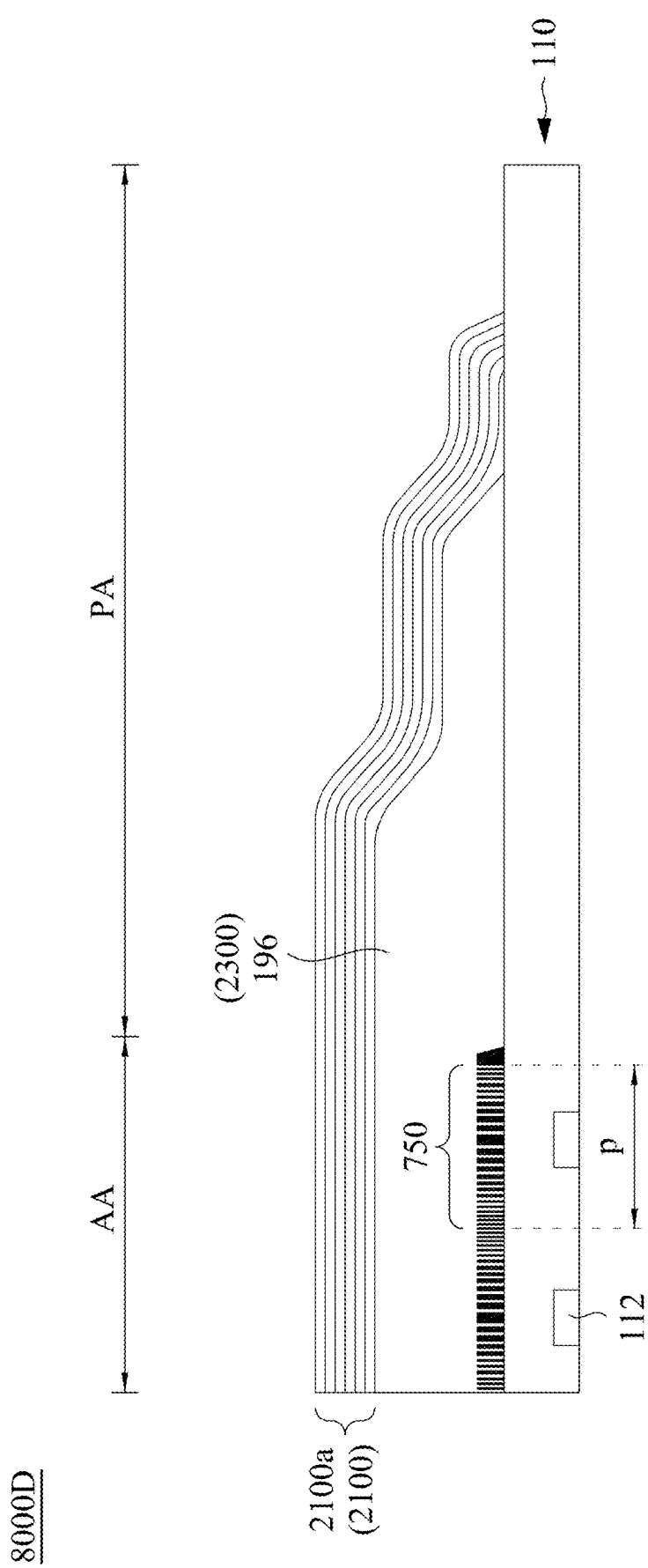

FIG. 9 to FIG. 11 are cross-sectional view of image sensors 8000B, 8000C, 8000D in accordance with some embodiments of the present disclosure.

Please refer to FIG. 8 and FIG. 9. The differences between the image sensor 8000A in FIG. 8 and the image sensor 8000B in FIG. 9 are the remaining portion 730a of the refill layer 730. Specifically, the image sensor 8000B is free of the remaining portion 730a.

Please refer to FIG. 8 and FIG. 10. The differences between the image sensor 8000A in FIG. 8 and the image sensor 8000C in FIG. 10 are the first portion 710a of the underlying layer 710. Specifically, the image sensor 8000C is free of the first portion 710a of the underlying layer 710.

Please refer to FIG. 8 and FIG. 11. The differences between the image sensor 8000A in FIG. 8 and the image sensor 8000D in FIG. 11 are the first portion 710a of the underlying layer 710 and the remaining portion 730a of the refill layer 730. Specifically, the image sensor 8000D is free of the first portion 710a of the underlying layer 710 and the remaining portion 730a of the refill layer 730.

Please refer to FIG. 1L, FIG. 4, FIG. 6, and FIG. 8 to FIG. 11 again. In the image sensors 1000A, 1000B, 1000C of FIG. 1L, FIG. 4, FIG. 6, respectively, one lens 180 corresponds to one photosensitive element 112. In the image sensors 8000A~8000D of FIG. 8 to FIG. 11, respectively, one lens 750 (including multiple pillars) corresponds to one photosensitive element 112. Therefore, one lens 180 or one lens 750 may be understood as a pixel size.

FIG. 12 is a top view of a region A of the image sensor 8000A illustrated in FIG. 8. Specifically, a cross-sectional view under a line A-A' in FIG. 12 is the region A in FIG. 8, in which FIG. 12 merely illustrates the lenses 750 and the remaining portion 730a of the refill layer 730 are and other elements are omitted for clarity. As shown in FIG. 12, the lenses 750 are arranged in a meta-surface array, in which the numbers of rows and columns are not limited by the array shown in FIG. 12.

Figure 13C:
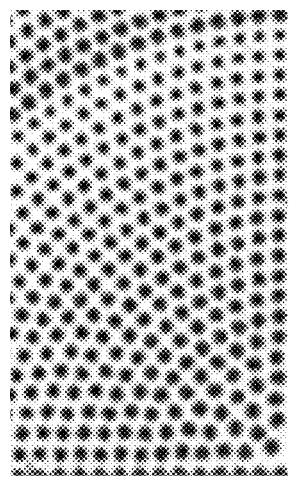
FIG. 13A, FIG. 13B, and FIG. 13C are top views of a meta-surface lens in FIG. 12.
Figure 13B:
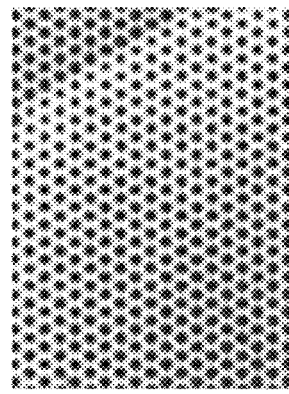
Figure 13A:
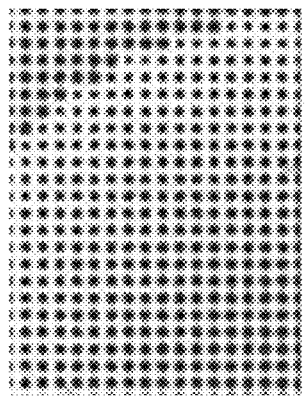

FIG. 13A, FIG. 13B, and FIG. 13C are top views of the meta-surface lens 750 in FIG. 12. It is understood that a shape of each pillar in the meta-surface lenses 750 is round in a top view. As shown in FIG. 13A, the pillars are in a square arrangement. As shown in FIG. 13B, the pillars are in a hexagonal arrangement. As shown in FIG. 13C, the pillars are in a circular arrangement. Other arrangements of the pillars are also included in the present disclosure.

The lenses 180 in the image sensors 1000A~1000C mentioned above are micro-lenses. The lenses 750 in the image sensors 8000A~8000D mentioned above are meta-surface lenses. The working wavelength of the image sensors 1000A~1000C and 8000A~8000D may be in a range from 780~15000 nm, such as 800~2500 nm, or 1100~2000 nm. In some embodiment, the image sensors of the present disclosure are suitable for near-infrared light applications.

The manufacturing methods for the disclosed image sensors could avoid damaging the substrate below the lens material when forming the lens array (includes the micro-lens array and the meta-surface array), thereby improving the performances of the image sensors. In addition, thicknesses of the disclosed image sensors from the lens array area to the periphery area are gradually decreased, so it could prevent a stress imbalance between a lens array (such as the lenses 180 and 750) and elements disposed above the lens array from the delamination between different materials, thereby providing well optical performances.

The present disclosure has been disclosed as hereinabove, however it is not used to limit the present disclosure. Those skilled in the art may make various changes, substitutions, and alterations herein without departing from the spirit and scope of the present disclosure. Therefore, the scope of protection of the present disclosure shall be subject to the scope of the claim attached in the application and its equivalent constructions.

What is claimed is:

1. A manufacturing method for an image sensor, comprising:
   providing a substrate;
   forming a lens layer above the substrate;
   forming a patterned hard mask layer on the lens layer;
   etching the lens layer to transfer a pattern of the patterned hard mask layer to the lens layer such that a plurality of lenses are defined, wherein the lenses are micro-lenses or meta-surface lenses;
   forming a cladding layer to cover the plurality of lenses and the substrate;
   etching portions of the cladding layer to form a first inclined sidewall and a second inclined sidewall, wherein the first inclined sidewall is above the second inclined sidewall, wherein a projection of the first inclined sidewall on the substrate is spaced apart from a projection of the second inclined sidewall on the substrate; and
   conformally forming a bandpass filter layer having multiple films on the cladding layer and covering the substrate.

2. The manufacturing method for the image sensor of claim 1, wherein before forming the lens layer above the substrate, further comprising:
   forming a photoresist layer with a third inclined sidewall and having a trench on the substrate;
   forming the lens layer with a fourth inclined sidewall in the trench; and
   removing the photoresist layer, wherein an angle between the third inclined sidewall and a top surface of the substrate is greater than 90 degrees, and an angle between the fourth inclined sidewall and the top surface of the substrate is less than 90 degrees.

3. The manufacturing method for the image sensor of claim 2, wherein after forming the lens layer above the substrate, further comprising:
   forming a refill layer on the substrate and surrounding the lens layer, wherein a top surface of the lens layer is substantially coplanar with a top surface of the refill layer;
   forming the patterned hard mask layer on the refill layer; and
   etching the refill layer to transfer the pattern of the patterned hard mask layer to the refill layer such that a remaining portion of the refill layer and an underlying layer are defined, wherein the underlying layer is disposed between the plurality of lenses and the substrate, and the underlying layer connects to the remaining portion.

4. The manufacturing method for the image sensor of claim 3, wherein after the remaining portion of the refill layer and the underlying layer are defined, further comprising:
   forming a protection layer to cover the plurality of lenses and expose the remaining portion of the refill layer;
   removing the remaining portion of the refill layer;
   removing the protection layer; and
   forming an anti-reflective film on top surfaces of the plurality of lenses.

5. The manufacturing method for the image sensor of claim 3, wherein after the remaining portion of the refill layer and the underlying layer are defined, further comprising:
   forming a protection layer to cover the plurality of lenses and a first portion of the remaining portion of the refill layer, wherein a second portion of the remaining portion of the refill layer is exposed;
   removing the second portion of the remaining portion of the refill layer;
   removing the protection layer; and
   forming an anti-reflective film on top surfaces of the plurality of lenses and a top surface of the first portion of the remaining portion of the refill layer.

6. The manufacturing method for the image sensor of claim 1, wherein before forming the lens layer above the substrate, forming an underlying layer on the substrate.

7. The manufacturing method for the image sensor of claim 1, wherein forming the cladding layer to cover the plurality of lenses and the substrate, and etching the portions of the cladding layer to form the first inclined sidewall and the second inclined sidewall, further comprising:
   forming a first cladding layer to cover the plurality of lenses and the substrate;
   etching a portion of the first cladding layer to expose a portion of the substrate and form a third inclined sidewall;
   forming a second cladding layer on the first cladding layer and the portion of the substrate to form the first inclined sidewall on a top of the cladding layer; and
   etching a portion of the second cladding layer to form the second inclined sidewall on a bottom of the cladding layer.

8. The manufacturing method for the image sensor of claim 7, wherein an angle between the second inclined sidewall and a top surface of the substrate is in a range from 20 degrees to 60 degrees,
   wherein an angle between the third inclined sidewall and the top surface of the substrate is in a range from 20 degrees to 60 degrees.

9. The manufacturing method for the image sensor of claim 1, wherein etching the portions of the cladding layer to form the first inclined sidewall and the second inclined sidewall, further comprising:
   etching a first portion of the cladding layer to form the first inclined sidewall on a top of the cladding layer, wherein an angle between the first inclined sidewall and a top surface of the substrate is in a range from 20 degrees to 60 degrees; and
   etching a second portion of the cladding layer to form the second inclined sidewall on a bottom of the cladding layer, wherein an angle between the second inclined sidewall and the top surface of the substrate is in a range from 20 degrees to 60 degrees.

10. An image sensor, comprising:
    a substrate;
    a plurality of lenses disposed on the substrate, wherein the plurality of lenses are micro-lenses or meta-surface lenses;
    a cladding layer disposed on the plurality of lenses and the substrate,
      wherein the cladding layer has a first inclined sidewall and a second inclined sidewall, and the first inclined sidewall is above the second inclined sidewall, wherein a projection of the first inclined sidewall on the substrate is spaced apart from a projection of the second inclined sidewall on the substrate; and a bandpass filter layer having multiple films conformally disposed on the cladding layer and covering the substrate.

11. The image sensor of claim 10, further comprising an anti-reflective film disposed on top surfaces of the lens.

12. The image sensor of claim 10, further comprising a refill layer disposed on the substrate and surrounding the plurality of lenses, wherein a thickness of the refill layer is in a range from 0.1 μm to 100 μm.

13. The image sensor of claim 12, further comprising an anti-reflective film disposed on top surfaces of the lens and a top surface of the refill layer.

14. The image sensor of claim 10, further comprising an underlying layer disposed between the plurality of lenses and the substrate, wherein a thickness of the underlying layer is in a range from 0.01 μm to 100 μm.

15. The image sensor of claim 14, wherein a material of the lenses is a-Si, SiH, GeH, Ge, GeO, or GeSiH.

16. The image sensor of claim 14, wherein a material of the underlying layer is different from a material of the lenses.

17. The image sensor of claim 14, wherein a material of the underlying layer is the same as a material of the lenses, and a thickness of the underlying layer is in a range from 0.01 μm to 100 μm.

18. The image sensor of claim 14, wherein a distance between an outermost of the second inclined sidewall to an outermost of the underlying layer is in a range from 40 μm to 100 μm.

19. The image sensor of claim 14, wherein, when the plurality of lenses are micro-lenses, a projection of the micro-lenses on the substrate is in a projection of the underlying layer on the substrate.

20. The image sensor of claim 10, wherein an angle between the first inclined sidewall and a top surface of the substrate is in a range from 20 degrees to 60 degrees, wherein an angle between the second inclined sidewall and the top surface of the substrate is in a range from 20 degrees to 60 degrees.

* * * * *